(12) United States Patent
Jung

(10) Patent No.: US 11,392,236 B2
(45) Date of Patent: Jul. 19, 2022

(54) TOUCH FORCE SENSOR USING INDUCTIVE SENSING AND CAPACITIVE SENSING AND METHOD OF OPERATING SAME

(71) Applicant: DAMOATECH CO., LTD., Seongnam-si (KR)

(72) Inventor: Hu Min Jung, Hanam-si (KR)

(73) Assignee: DAMOATECH CO., LTD., Seongnam-si (KR)

( * ) Notice: Subject to any disclaimer, the term of this patent is extended or adjusted under 35 U.S.C. 154(b) by 91 days.

(21) Appl. No.: 16/931,946

(22) Filed: Jul. 17, 2020

(65) Prior Publication Data
US 2021/0019009 A1   Jan. 21, 2021

(30) Foreign Application Priority Data
Jul. 18, 2019   (KR) .................. 10-2019-0086776

(51) Int. Cl.
| G06F 3/041 | (2006.01) |
| G06F 3/044 | (2006.01) |
| G06F 3/046 | (2006.01) |
| G01D 5/20 | (2006.01) |
| G01D 5/24 | (2006.01) |

(52) U.S. Cl.
CPC ......... *G06F 3/0414* (2013.01); *G01D 5/2006* (2013.01); *G01D 5/24* (2013.01); *G06F 3/044* (2013.01); *G06F 3/046* (2013.01)

(58) Field of Classification Search
CPC ..... H03K 17/962; H03K 2217/960755; H03K 17/97; H03K 17/975; H03K 2217/96038; H03K 2217/96054; H03K 2217/9651; G01D 5/2006; G01D 5/24; G06F 2203/04105; G06F 2203/04108; G06F 3/0414; G06F 3/044; G06F 3/046
See application file for complete search history.

(56) References Cited

U.S. PATENT DOCUMENTS

| 8,408,723 B2 | 4/2013 | Porter et al. | |
| 2011/0187204 A1* | 8/2011 | Lacey | H03K 17/96 |
| | | | 307/139 |

(Continued)

FOREIGN PATENT DOCUMENTS

| JP | 2007-059074 A | 3/2007 |
| KR | 10-2010-0039012 A | 4/2010 |

(Continued)

*Primary Examiner* — Hong Zhou
(74) *Attorney, Agent, or Firm* — United One Law Group LLC; Kongsik Kim; Jhongwoo Peck

(57) ABSTRACT

A touch force sensor includes a reference resonant circuit, a first resonant circuit coupled to an inductive coil, a second resonant circuit connected to a touch electrode, and further includes a determination circuit configured to obtain a first resonant frequency attributable to a first inductance formed in an inductive coil and a first resonant circuit based on a displacement between a target and the inductive coil formed by an external force input in a Z-axis direction, the second resonant frequency of a second resonant circuit attributable to a capacitance varying depending on whether a finger comes into contact with the touch electrode, and information about a reference resonant frequency.

18 Claims, 17 Drawing Sheets

(56) References Cited

U.S. PATENT DOCUMENTS

| | | | |
|---|---|---|---|
| 2013/0020186 A1* | 1/2013 | Lai | G06F 3/0414 |
| | | | 200/5 A |
| 2016/0018940 A1* | 1/2016 | Lo | G06F 3/0446 |
| | | | 345/174 |
| 2017/0016255 A1 | 1/2017 | Guibbert et al. | |
| 2017/0269754 A1 | 9/2017 | Liu | |
| 2018/0039351 A1* | 2/2018 | Zhu | G06F 3/0447 |
| 2018/0074636 A1* | 3/2018 | Lee | G06F 3/0488 |
| 2018/0093695 A1* | 4/2018 | Hattori | G01B 7/14 |
| 2018/0129324 A1 | 5/2018 | Soh et al. | |
| 2018/0180450 A1 | 6/2018 | Liu | |
| 2018/0260050 A1* | 9/2018 | Unseld | G06F 3/0445 |
| 2020/0025964 A1* | 1/2020 | Kubo | G01V 3/08 |
| 2020/0047712 A1* | 2/2020 | Spick | B60R 25/01 |
| 2020/0061955 A1* | 2/2020 | Braysy | B32B 3/30 |
| 2020/0341584 A1* | 10/2020 | Wang | G06F 3/04144 |
| 2021/0164766 A1* | 6/2021 | Reime | G01D 5/202 |
| 2021/0246694 A1* | 8/2021 | Spick | E05B 81/77 |

FOREIGN PATENT DOCUMENTS

| | | |
|---|---|---|
| KR | 10-1147607 B1 | 5/2012 |
| KR | 10-2017-0007127 A | 1/2017 |
| KR | 101697975 B1 | 1/2017 |
| KR | 10-2018-0084484 A | 7/2018 |
| KR | 10-1920440 B1 | 11/2018 |
| KR | 10-1954368 B1 | 3/2019 |

* cited by examiner

TOUCH FORCE SENSOR USING INDUCTIVE SENSING AND CAPACITIVE SENSING AND METHOD OF OPERATING SAME

CROSS-REFERENCE TO RELATED APPLICATION

This application claims the priority from Korean Patent Application No. 10-2019-0086776 filed on Jul. 18, 2019, which is incorporated herein by reference in its entirety.

TECHNICAL FIELD

The present invention relates generally to a touch force sensor and a method of operating the same, and more particularly to a touch force sensor that detects the degree of force by using inductance varying depending on a change in the distance between a target layer and a coil, formed on a printed circuit board (PCB) or flexible PCB (FBCB) or as a transparent electrode, attributable to external force, and a method of operating the same.

The present invention was derived from the research conducted as part of the Start-up Leaping Package Support Project sponsored by the Korean Ministry of SMEs and Startups and the Korea Institute of Startup & Entrepreneurship Development [Project Management No.: 10221619; and Project Name: Development of Force Sensor Module Operable in External Metal of Smart Device].

BACKGROUND ART

Recently, touch recognition technology has made rapid progress. In two-dimensional (2D) touch recognition technology that recognizes a touch location using coordinates on X and Y axes, there has emerged a three-dimensional (3D) touch recognition function that enhances a user interface by detecting the intensity of touch (the amount of force applied in an Z-axis direction) rather than simply determining whether a touch is made.

Apple Inc.'s 3D touch has introduced a technology that combines a touch sensor and a pressure sensor with each other, thereby recognizing the intensity of touch in a differentiated manner. However, the method of combining a touch sensor and a pressure sensor increases hardware manufacturing cost, and has difficulty in accurately recognizing the intensity of a user's touch because the sensitivity of the pressure sensor is not sufficiently high.

Texas Instruments Inc.'s U.S. Patent Application Publication No. US 2017/0269754 discloses a "Dual Touch Sensor Architecture With XY-Position And Z-Force Sensing For Touch-On-Surface Button" configured such that a capacitive touch sensor and an inductive sensor are combined with each other, whether a touch is made and the location of the touch on the XY plane are recognized by the capacitive touch sensor, and the touch force at the touch location in the Z-axis direction is recognized by the inductive sensor.

Texas Instruments Inc.'s another U.S. Patent Application Publication No. US 2018/0180450 discloses an "Inductive Touch Input" configured such that whether a touch is made and touch force are detected at different locations by using a plurality of inductive touch sensors, and a touch scroll gesture is recognized by recognizing whether a touch is made and the movement pattern of the touch force.

As conventional technologies for detecting a user's intention to lock or unlock a car door by detecting a force applied to the car door by applying the 3D touch force recognition technology, there are disclosed Korean Patent Application Publication No. 10-2017-0007127 and US Patent Application Publication No. US 2017/0016255 entitled "Device for Detecting a User's Intention to Lock or Unlock a Motor Vehicle Door." As conventional technologies for implementing an inductive force sensor by implementing a coil on an FPCB, there are introduced Korean Patent No. 10-1920440 entitled "Self-Inductive Force Sensor Module for 3D Touch Implementation," and Korean Patent No. 10-1954368 entitled "Mutual Inductive Force Sensor Module for 3D Touch Implementation."

The conventional technologies for sensing touch force using an inductive sensor introduce technology for recognizing touch force by selecting a new material or component such as the disposition of a part and an element, the adoption of an FPCB, or the like. However, when only an inductive sensor is used, a problem arises in that the precision of sensing a touch location and touch force is low. In contrast, when an inductive sensor is combined with another sensor, a problem arises in that hardware cost increases.

Furthermore, due to the recent emergence of mobile devices and smart devices, there are various needs for user interfaces and user experiences. In order to meet these needs, there is a demand for technology capable of recognizing touch force for each minute area. For this purpose, there is required technology in which touch sensors/touch force sensors are densely arranged and the individual sensors are recognized separately. However, it is difficult for the conventional technologies to meet these requirements.

SUMMARY OF THE DISCLOSURE

The conventional technologies are configured to improve the sensitivity of a sensor through the disposition of a part and an element and the selection of a part or a material, to combine an inductive sensor with another sensor to separately detect touch force and a touch location, and to implement a plurality of inductive sensors to recognize a user's gesture pattern by tracking the detection information of the inductive sensors.

Furthermore, the conventional technologies are configured to calculate the frequency in the case of having the maximum magnitude as a resonant frequency by scanning the magnitude of an output electric signal generated in a resonant circuit in response to an input electric signal in such a manner as to vary the frequency of the input electric signal applied to the resonant circuit. Due to this configuration, the conventional technologies have problems in that there occurs an error corresponding to the resolution of the variable frequency of an input electric signal, accuracy is low due to the indirect method of detecting the magnitude of an electrical signal and calculating a resonant frequency, and measurement takes a considerably long time because the frequency of an input electric signal needs to be varied.

Furthermore, the conventional technologies have difficulty in performing precise measurement because they calculate a resonant frequency and an inductance by detecting the magnitude of an electric signal, and thus they mainly determine whether a change in inductance exceeds a specific threshold value, but does not provide sufficient accuracy to quantitatively analyze changes in inductance.

The present invention has been conceived to overcome the problems of the conventional technologies, and an object of the present invention is to provide a touch force sensor in which the performance of an inductive sensor is improved such that the inductive sensor detects a touch location and touch force, and a capacitive sensor detects whether a touched finger is an actual human finger, thereby preventing erroneous operation from being performed by force applied from the outside, and a method of operating the same.

Of the conventional technologies, the technology disclosed in U.S. Patent Application Publication No. US 2017/0269754 is configured such that the capacitive touch sensor recognizes whether a touch is made and a touch location on the XY plane and the inductive sensor recognizes touch force in the Z-axis direction at the touch location. In this conventional technology, precise location recognition is performed by the capacitive sensor, so that the inductive sensor recognizes only touch force, main operation is performed by the capacitive sensor, and the inductive sensor is dependent on the capacitive sensor. In the conventional technology, the operation of the inductive sensor takes a long time, and thus the inductive sensor operates only when the capacitive sensor first recognizes whether a touch is made and a touch location. In this method, there may be a time difference between the touch recognition of the capacitive sensor and the touch force recognition of the inductive sensor and the inductive sensor takes a long time to recognize touch force, so that it is difficult to perform the recognition of a 3D touch gesture based on touch force.

An object of the present invention is to provide a touch force sensor that shortens the operation time of an inductive sensor, and cross-validates the detection information of a capacitive sensor and the detection information of the inductive sensor while operating the capacitive sensor and the inductive sensor at substantially the same time, thereby enabling detected information about whether a finger makes a touch, whether a touched finger is a human finger, a touch location, and touch force to be recognized as a valid touch event and facilitating the recognition of a 3D touch gesture based on touch force, and a method of operating the same.

An object of the present invention is to provide a touch force sensor that increases the precision and reliability of detection of a touch and touch force by using a capacitive sensor and an inductive sensor that operate independently of each other, and a method of operating the same.

Furthermore, an object of the present invention is to provide a touch force sensor that detects changes in capacitance and inductance only by single measurement without the variation of frequency or the input of different frequency components, and thus, even in the case of a multi-channel touch force sensor, a touch location and touch force are rapidly detected and a user's intention is recognized, and a method of operating the same.

An object of the present invention is to provide a touch force sensor that does not require the variation of frequency or the input of different frequency components, and thus power consumption required to detect a touch location and touch force is reduced and power consumption is also reduced considerably in the case of a multi-channel touch force sensor, and a method of operating the same.

An object of a touch force sensor according to the present invention is to propose a circuit capable of effectively detecting a shift in resonant frequency and a method of operating the same. Furthermore, an object of a touch force sensor according to the present invention is to reduce the time required to detect a touch location and touch force because the process of varying the frequency of an input electric signal is not necessary.

An object of the present invention is to propose a structure capable of reducing the size and form factor of a touch force sensor by sharing a single reference resonant circuit between a capacitive sensor and an inductive sensor. Furthermore, an object of the present invention is to propose a touch force sensor structure capable of reducing hardware cost by sharing a single reference resonant circuit among multi-channel capacitive and inductive sensors.

According to an aspect of the present invention, there is provided a touch force sensor including: a first capacitive channel resonant circuit connected to a touch electrode disposed in a contact portion with which a finger comes into contact; a first oscillator configured to apply a first alternating current (AC) signal to the first capacitive channel resonant circuit; a capacitive determination circuit configured to detect the first capacitive resonant frequency of a first electric signal formed in the first capacitive channel resonant circuit, and to determine whether a finger comes into contact with the contact portion and whether a finger that comes into contact with the contact portion is a human finger based on the detected first capacitive resonant frequency; a first part exposed to an external force in a Z-axis direction, and configured to be elastically deformable along the Z-axis direction by the external force in the Z-axis direction; an inductive coil disposed on a substrate that is spaced apart from the first part; a first inductive channel resonant circuit coupled to the inductive coil, and configured to have a first inductive resonant frequency attributable to a first inductance formed in the inductive coil based on the displacement of the first part relative to the inductive coil; a second oscillator configured to apply a second AC signal to the first inductive channel resonant circuit; and an inductive determination circuit configured to receive a second electric signal formed in the first inductive channel resonant circuit, and to determine the displacement of the first part and the external force in the Z-axis direction based on the first inductive resonant frequency of the second electric signal.

In this case, the touch force sensor may further include: a reference resonant circuit; and a reference oscillator configured to have the same characteristics as the first and second oscillators, and to apply a reference AC signal to the reference resonant circuit. The capacitive determination circuit may detect the difference between the reference resonant frequency of a reference electric signal, formed in the reference resonant circuit under the influence of the reference AC signal applied to the reference resonant circuit, and the first capacitive resonant frequency, and may determine whether a finger comes into contact with the contact portion and whether a finger that comes into contact with the contact portion is a human finger based on the difference between the reference resonant frequency and the first capacitive resonant frequency. The inductive determination circuit may detect the difference between the reference resonant frequency and the first inductive resonant frequency, and may determine the displacement of the first part and the external force in the Z-axis direction based on the difference between the reference resonant frequency and the first inductive resonant frequency.

In this case, when a human finger comes into contact with the contact portion from the outside and the external force in the Z-axis direction is applied by the contact of the finger, the capacitive determination circuit may detect the touch location of the finger, the inductive determination circuit may detect the touch location of the finger, or each of the capacitive determination circuit and the inductive determination circuit may detect the touch location of the finger and perform cross-validation.

In this case, the inductive determination circuit may be further configured to, when the difference between the reference resonant frequency and the first inductive resonant frequency is equal to or larger than a first threshold value, determine that the external force in the Z-axis direction has been input by considering that the first inductive resonant frequency has caused a significant change.

In this case, the capacitive determination circuit may be further configured to, when the difference between the reference resonant frequency and the first capacitive resonant frequency is equal to or larger than a second threshold value, determine that a finger comes into contact with the contact portion by considering that the first capacitive resonant frequency has caused a significant change.

In this case, the capacitive determination circuit may be further configured to determine whether a finger that comes into contact with the contact portion is a human finger based on whether the difference between the reference resonant frequency and the first capacitive resonant frequency is equal to or larger than a third threshold value.

In this case, the inductive determination circuit may include: an operator configured to obtain a difference between the first inductive resonant frequency and the reference resonant frequency; a low-pass filter connected to an output terminal of the operator, and configured to remove a high-frequency component; and a time-to-digital converter connected to an output terminal of the low-pass filter, and configured to digitally count the frequency of a differential frequency component signal corresponding to the difference between the first inductive resonant frequency and the reference resonant frequency.

In this case, the capacitive determination circuit may include: an operator configured to obtain a difference between the first capacitive resonant frequency and the reference resonant frequency; a low-pass filter Low pass filter connected to the output terminal of the operator, and configured to remove a high-frequency component; and a time-to-digital converter connected to the output terminal of the low-pass filter, and configured to digitally count the frequency of a differential frequency component signal corresponding to the difference between the first capacitive resonant frequency and the reference resonant frequency.

In this case, the inductive determination circuit may perform a calibration process based on the difference between the first inductive resonant frequency and the reference resonant frequency in the state in which the first inductive channel resonant circuit has been externally and forcibly adjusted to a first state having the same impedance as the reference resonant circuit.

In this case, the capacitive determination circuit may perform a calibration process based on the difference between the first capacitive resonant frequency and the reference resonant frequency in the state in which the first capacitive resonant circuit has been externally and forcibly adjusted to a second state having the same impedance as the reference resonant circuit.

The reference resonant circuit may be designed to have the same impedance as a predetermined first state of the states that the first inductive channel resonant circuit may have and to have the same impedance as a predetermined second state of the state that first capacitive resonant circuit may have. In this case, the first state may be a state in which an external force in the Z-axis direction is not applied, and the second state may be a state in which a finger does not come into contact with the contact portion.

According to another aspect of the present invention, there is provided a touch force sensor including: a first capacitive channel resonant circuit connected to a first touch electrode of a plurality of touch electrodes disposed in a contact portion with which a finger comes into contact; a second capacitive channel resonant circuit connected to a second touch electrode of the plurality of touch electrodes disposed in the contact portion with which the finger comes into contact; a capacitive determination circuit configured to detect the first capacitive resonant frequency of a first electric signal generated by the application of a first alternating current (AC) signal to the first capacitive channel resonant circuit, to detect the second capacitive resonant frequency of a second electric signal generated by the application of a second AC signal to the second capacitive channel resonant circuit, to determine whether the finger comes into contact with a first touch electrode location corresponding to the first touch electrode of the contact portion based on the detected first capacitive resonant frequency, to determine whether the finger comes into contact with a second touch electrode location corresponding to the second touch electrode of the contact portion based on the detected second capacitive resonant frequency, and to determine whether a finger that comes into contact with the contact portion is a human finger based on the first capacitive resonant frequency and the second capacitive resonant frequency; a second part exposed to an external force in a Z-axis direction, and configured to include a plurality of individual regions elastically deformable along the Z-axis direction by the external force in the Z-axis direction; a plurality of inductive coils disposed on a substrate that is spaced apart from the second part, configured to correspond to the plurality of individual regions, respectively, and disposed to be opposite to the plurality of individual regions, respectively; a first inductive channel resonant circuit coupled to a first inductive coil of the plurality of inductive coils, and configured to have a first inductive resonant frequency attributable to a first inductance formed in the first inductive coil based on a first displacement of a first individual region corresponding to the first inductive coil; a second inductive channel resonant circuit coupled to a second inductive coil of the plurality of inductive coils, and configured to have a second inductive resonant frequency attributable to a second inductance formed in the second inductive coil based on a second displacement of a second individual region corresponding to the second inductive coil; and an inductive determination circuit configured to receive a third electric signal generated by the application of a third AC signal to the first inductive channel resonant circuit and a fourth electric signal generated by the application of a fourth AC signal to the second inductive channel resonant circuit, and to determine the first displacement, the second displacement, a location at which the external force in the Z-axis direction is input, and the external force based on the first inductive resonant frequency of the third electric signal and the second inductive resonant frequency of the fourth electric signal.

In this case, the touch force sensor may further include a reference resonant circuit. The capacitive determination circuit may detect the difference between the reference resonant frequency of a reference electric signal, formed in the reference resonant circuit under the influence of the reference AC signal applied to the reference resonant circuit, and the first capacitive resonant frequency, and may determine whether the finger comes into contact with the first touch electrode location and whether a finger that comes into contact with the first touch electrode location is a human finger based on the difference between the reference resonant frequency and the first capacitive resonant frequency. The capacitive determination circuit may detect the difference between the reference resonant frequency and the second capacitive resonant frequency, and may determine whether the finger comes into contact with the second touch electrode location and a finger that comes into contact with the second touch electrode location is a human finger based on the difference between the reference resonant frequency and the second capacitive resonant frequency.

The inductive determination circuit may detect the difference between the reference resonant frequency and the first inductive resonant frequency, and may obtain quantified detection information for the external force in the Z-axis direction appearing in the first displacement and the first individual region based on the difference between the reference resonant frequency and the first inductive resonant frequency. The inductive determination circuit may detect the difference between the reference resonant frequency and the second inductive resonant frequency, and may obtain quantified detection information for the external force in the Z-axis direction appearing in the second displacement and the second individual region based on the difference between the reference resonant frequency and the second inductive resonant frequency.

In this case, when a human finger comes into contact with the contact portion from the outside and the external force in the Z-axis direction is applied by the contact of the finger, the capacitive determination circuit may detect a touch location at which the finger comes into contact with the contact portion based on whether the finger comes into contact with the first touch electrode location or the second touch electrode location, the inductive determination circuit may detect the touch location based on whether the finger comes in proximity to the first individual region or the second individual region, or each of the capacitive determination circuit and the inductive determination circuit may detect the touch location and perform cross-validation.

The inductive determination circuit may be further configured to, when at least one of the difference between the reference resonant frequency and the first inductive resonant frequency and the difference between the reference resonant frequency and the second inductive resonant frequency is equal to or larger than a first threshold value, determine that the external force in the Z-axis direction has been input by considering that at least one of the first inductive resonant frequency and the second inductive resonant frequency has caused a significant change.

The capacitive determination circuit may be configured to, when at least one of the difference between the reference resonant frequency and the first capacitive resonant frequency and the difference between the reference resonant frequency and the second capacitive resonant frequency is equal to or larger than a second threshold value, determine that a finger comes into contact with the contact portion by considering that at least one of the first capacitive resonant frequency and the second capacitive resonant frequency has caused a significant change. The capacitive determination circuit may be configured to determine whether a finger that comes into contact with the contact portion is a human finger based on whether at least one of the difference between the reference resonant frequency and the first capacitive resonant frequency and the difference between the reference resonant frequency and the second capacitive resonant frequency is equal to or larger than a third threshold value.

The first touch electrode may cover a first group area including a first group of a plurality of individual regions among the plurality of individual regions, and the second touch electrode may cover a second group area including a second group of a plurality of individual regions among the plurality of individual regions.

The first individual region may cover a third group area including touch electrode locations of a third group of a plurality of touch electrodes among the plurality of touch electrodes, and the second individual region may cover a fourth group area including touch electrode locations of a fourth group of a plurality of touch electrodes among the plurality of touch electrodes.

The inductive determination circuit may include: an operator configured to obtain the difference between the first inductive resonant frequency and the reference resonant frequency and the difference between the second inductive resonant frequency and the reference resonant frequency; a low-pass filter connected to the output terminal of the operator, and configured to remove a high-frequency component; and a time-to-digital converter connected to the output terminal of the low-pass filter, and configured to digitally count the frequency of a first differential frequency component signal corresponding to the difference between the first inductive resonant frequency and the reference resonant frequency and the frequency of a second differential frequency component signal corresponding to the difference between the second inductive resonant frequency and the reference resonant frequency.

The capacitive determination circuit may include: an operator configured to obtain the difference between the first capacitive resonant frequency and the reference resonant frequency and the difference between the second capacitive resonant frequency and the reference resonant frequency; a low-pass filter connected to the output terminal of the operator, and configured to remove a high-frequency component; and a time-to-digital converter connected to the output terminal of the low-pass filter, and configured to digitally count the frequency of a first capacitive differential frequency component signal corresponding to the difference between the first capacitive resonant frequency and the reference resonant frequency and the frequency of a second capacitive differential frequency component signal corresponding to the difference between the second capacitive resonant frequency and the reference resonant frequency.

According to still another aspect of the present invention, there is provided a method of operating a touch force sensor that is performed by a touch force sensor including a touch electrode disposed in a contact portion with which a finger comes into contact, a first part exposed to an external force in a Z-axis direction and configured to be elastically deformable along the Z-axis direction by the external force in the Z-axis direction, and an inductive coil disposed on a substrate that is spaced apart from the first part.

The method of operating a touch force sensor includes: applying a first alternating current (AC) signal to a first capacitive channel resonant circuit connected to the touch electrode; applying a second AC signal to a first inductive channel resonant circuit having a first inductive resonant frequency attributable to a first inductance formed in the inductive coil based on the displacement of the first part, coupled to the inductive coil, relative to the inductive coil; applying a reference AC signal to a reference resonant circuit; receiving, by a capacitive determination circuit, a first electric signal formed in the first capacitive channel resonant circuit under the influence of the first AC signal; receiving, by an inductive determination circuit, a second electric signal formed in the first inductive channel resonant circuit under the influence of the second AC signal; receiving, by the capacitive determination circuit and the inductive determination circuit, a reference electric signal formed in the reference resonant circuit; determining, by the capacitive determination circuit, whether a finger comes into contact with the contact portion and whether a finger that comes into contact with the contact portion is a human finger based on the first capacitive resonant frequency of the first electric signal and the reference resonant frequency of the reference electric signal; and determining, by the inductive determination circuit, the displacement of the first part and the external force in the Z-axis direction based on the first inductive resonant frequency of the second electric signal and the reference resonant frequency.

In this case, the determining the displacement of the first part and the external force in the Z-axis direction may include: detecting the difference between the reference resonant frequency and the first inductive resonant frequency; and obtaining the extent to which the first inductive channel resonant circuit deviates from a first state having the same impedance as the reference resonant circuit, the displacement of the first part relative to the inductive coil, and quantified detection information for the external force in the Z-axis direction based on the difference between the reference resonant frequency and the first inductive resonant frequency.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE DISCLOSURE

Other objects and features of the present invention in addition to the above objects will be apparent from the following description of embodiments with reference to the accompanying drawings. Embodiments of the present invention will be described in detail below with reference to the accompanying drawings. In the following description, when it is determined that a detailed description of a related known component or function may unnecessarily make the gist of the present invention obscure, it will be omitted. A touch force sensor and a method of operating the same according to embodiments of the present invention will be described in detail below with reference to FIGS. 1 to 17.

In place of a capacitive proximity sensor, an inductive touch sensor has been proposed to measure inductance by causing a change in the magnetic field in a manner to recognize touch pressure by measuring a change in impedance. The fact that an inductive sensor is not sensitive to an external disturbance compared to a capacitive sensor also causes the use of the inductive sensor to spread.

Methods of implementing a touch force sensor using an inductive touch sensor are described in the above-mentioned prior art documents, e.g., U.S. Patent Application Publication No. US 2018/0180450 entitled "Inductive Touch Input," U.S. Patent Application Publication No. US 2017/0016255 entitled "Device for Detecting a User's Intention to Lock or Unlock a Motor Vehicle Door," and Korean Patent No. 10-1920440 entitled "Self-Inductive Force Sensor Module for 3D Touch Implementation."

Meanwhile, an inductive sensor requiring the use of a change in the magnetic field has difficulty in increasing detection precision compared to a capacitive sensor capable of precise detection using an electrical signal. The inductive sensing technologies disclosed in the prior art documents also detect whether a value in question is equal to or larger than a threshold value rather than performing a precise measurement, and are mainly used to detect a specific event.

Figure 1:
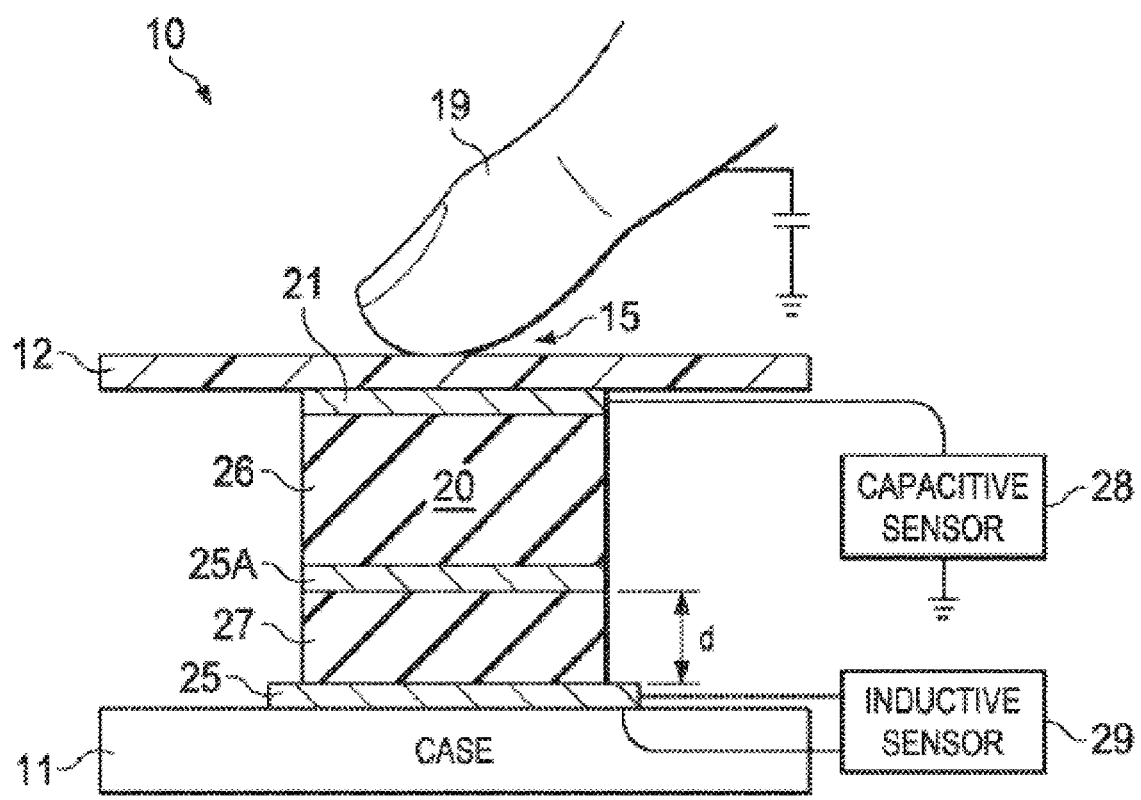
FIG. 1 is a diagram showing a conventional dual touch force sensor.

FIG. 1 is a diagram showing a conventional dual touch force sensor.

FIG. 1 shows the technology disclosed in U.S. Patent Application Publication No. US 2017/0269754 entitled "Dual Touch Sensor Architecture With XY-Position And Z-Force Sensing For Touch-On-Surface Button."

Referring to FIG. 1, a device 10 includes a dual touch sensor portion 20. The device 10 includes an inductive Z-force sensor 29 connected to an inductive coil 25 that is disposed on a case 11, and a capacitive XY location sensor 28 connected to an XY capacitive electrode 21 that comes into contact with a touch panel 12 and is disposed on a side opposite to a finger touch 19.

The determination of the touch contact location 15 of the finger touch 19 on an XY plane is performed in such a manner that the capacitive XY location sensor 28 detects a change in capacitance appearing on the XY capacitive electrode 21.

Inductive sensing is performed in such a manner that as dielectric foams 26 and 27 are compressed in a Z direction by the pressure of the finger touch 19 and the distance d between a conductive target 25A and the inductive coil 25 is varied, the inductive Z-force sensor 29 detects a change in the signal induced in the inductive coil 25.

The configuration of FIG. 1 and the configurations of the prior art documents may be included as part of the configurations of the present invention, and may be combined with the new configurations of the present invention to be described later to achieve unique effects of the present invention.

The present invention is intended to be combined particularly with a mobile device, a smart device, virtual reality, and/or augmented reality so that a user interface precisely recognizes touch force, accurately recognizes a user gesture, and determines a user's intention. The present invention proposes technology that precisely measures and quantifies touch force, the displacement of a target attributable to the touch force, and a change in inductance by improving the conventional inductive sensing, thereby determining a user's intention and accurately recognizing a user gesture.

Figure 2:
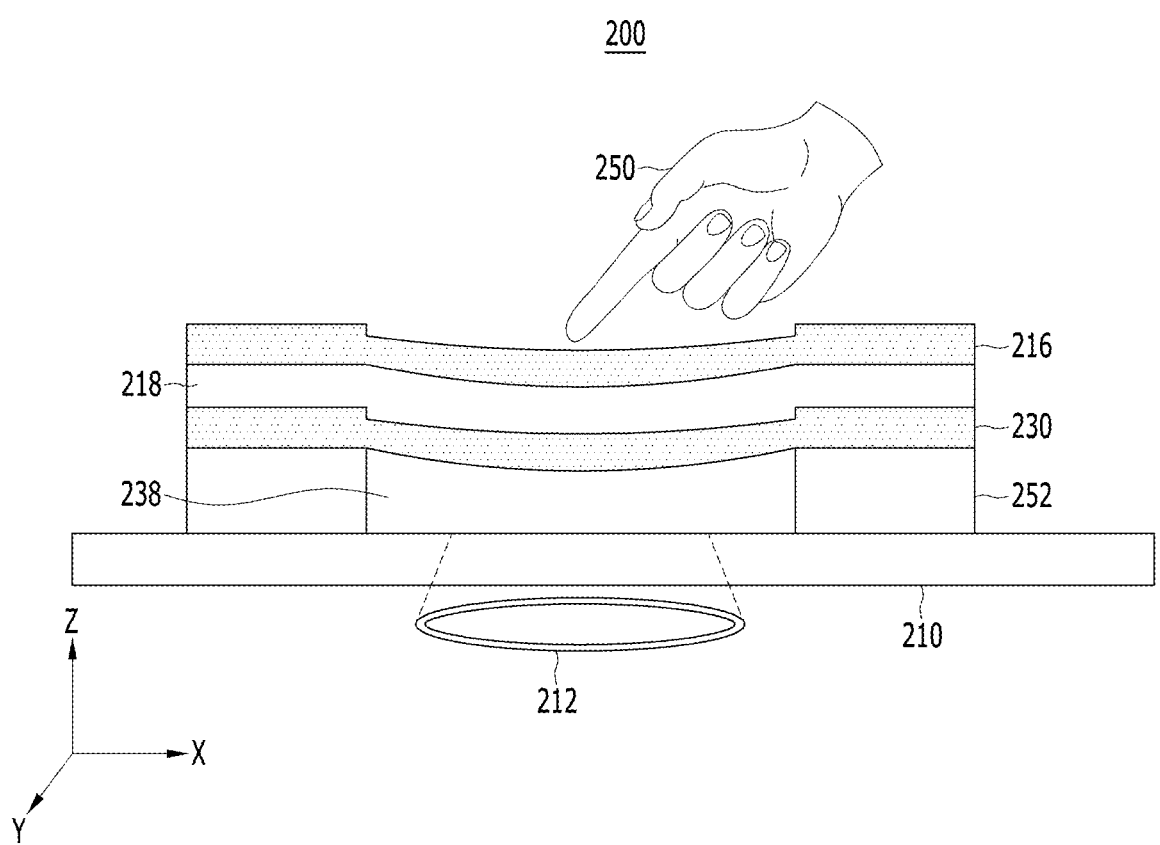
FIG. 2 is a diagram showing a touch force sensor according to an embodiment of the present invention.

FIG. 2 is a diagram showing a touch force sensor 200 according to an embodiment of the present invention. In FIG. 2, there is shown a touch force sensor 200 assuming a single button/channel/coil.

Referring to FIG. 2, the touch force sensor 200 according to the present embodiment includes: a first part 230 exposed to an external force 250 in a Z-axis direction, and configured to be elastically deformable in the Z-axis direction by the external force 250 in the Z-axis direction; an inductive coil 212 formed on a substrate 210 that is spaced apart from the first part 230; and a spacer layer 152 configured to support the first part 230 and to separate the touch force sensor 200 from other sensors or sensing channels.

The touch force sensor 200 shown in FIG. 2 forms a single channel. In an embodiment, an array or matrix may be implemented by arranging a plurality of touch force sensors, each of which is the same as the touch force sensor 200 shown in FIG. 2, in parallel.

When the first part 230 is elastically deformed by the external force 250 applied along the Z-axis direction, the location of the center of the first part 230 may be moved along the Z-axis direction according to the degree of deformation of the first part 230. In this case, the inductive coil 212 and first part 230 disposed on the PCB 210 are inductively coupled.

When the first part 230 is deformed by the external force 250 in the Z-axis direction, the displacement of the first part 230 in the Z-axis direction attributable to the deformation of the first part 230 may be detected through a change in inductance and a change in resonant frequency caused by inductive coupling between the inductive coil 212 and the first part 230.

A material having elastic restoring force, e.g., an elastic foam 238, may be disposed between the first part 230 and the inductive coil 212. When the external force 250 is applied, the location of the center of the first part 230 approaches the inductive coil 212, and accordingly the inductance formed in the inductive coil 212 inductively coupled to the first part 230 changes.

When the external force 250 is removed, the first part 230 returns to a location before the deformation by the elastic restoring force of the location elastic foam 238. In other words, the change in inductance appears only while the external force 250 is being applied. When this is detected, the external force 250 in the Z-axis direction may be detected.

When the distance by which the first part 230 is spaced apart from the inductive coil 212 in a first state in which the external force 250 is not applied is d0 and the distance by which the first part 230 is spaced apart from the inductive coil 212 in a state in which the external force 250 is applied is d, the displacement Δd=|d−d0| causes the change in inductance formed in the inductive coil 212 inductively coupled to the first part 230. Accordingly, when the change in inductance is detected, the displacement Δd may be detected, and the magnitude of the external force 250 may be quantified.

The touch force sensor 200 includes a touch electrode 216 disposed on a contact portion (not shown) that comes into contact with a finger that applies the external force 250. A dielectric layer or insulator layer 218 is disposed between the touch electrode 216 and the first part 230. In an embodiment, the touch electrode 216 and the dielectric layer or insulator layer 218 may be implemented to have elasticity. When the external force 250 is applied by an external finger, the touch electrode 216, the dielectric layer or insulator layer 218, and the first part 230 may be deformed in the Z-axis direction.

When an external finger comes into contact with or in proximity to the touch electrode 216 with the contact portion disposed therebetween, a capacitance formed in the touch electrode 216 is varied, and whether the external finger is in contact with or proximity to the touch electrode 216 and a location on an XY plane at which the external finger is in contact with or proximity to the touch electrode 216 may be determined by detecting a change in the electric signal that follows the varied capacitance.

In the present specification, for ease of description, one inductive coil 212 and a region covered by the inductive coil 212, or a unit within which the external force 250 or the contact or proximity of an external finger is detected by the touch electrode 216 will be referred to as a "channel."

The inductive coil 212 of the touch force sensor 200 according to an embodiment of the present invention may be formed by overlapping a plurality of unit coil windings in a concentric structure.

Most wearable devices use mechanical buttons that require cut-outs in the enclosure that forms a boundary with the outside, thereby making it difficult to seal each device and lowering the ingress protection (IP) rating, which means dustproof and waterproof functions. Furthermore, the mechanical buttons employ moving parts, metallic contacts, and gaskets. They have problems in that they have a reliability problem in the long term, cause an increase in cost, and have low resistance to environmental factors.

When a cut-out free enclosure can be implemented, a high IP rating can be implemented, and wearable devices having high IP ratings may be used for various purposes that have not been previously utilized. Gasket-less wearable devices with no moving parts can be physically more robust. For example, such wearable devices may be embedded in wearable elements such as gloves, and may be operated normally when they are put underwater and then exit out of water.

In order to achieve such high IP ratings, attempts have been made to utilize electromagnetic devices capable of recognizing touch pressure instead of mechanical buttons. In order to recognize touch pressure, inductive sensing is employed in the present invention, and is combined with the circuit configurations of FIGS. 11 and 13 to be described later to enable precise touch pressure recognition and touch location recognition.

In FIG. 2, the touch electrode 216 may be connected to a capacitive determination circuit that detects a change in the capacitance of the touch electrode 216, as shown in FIG. 1.

Figure 12:
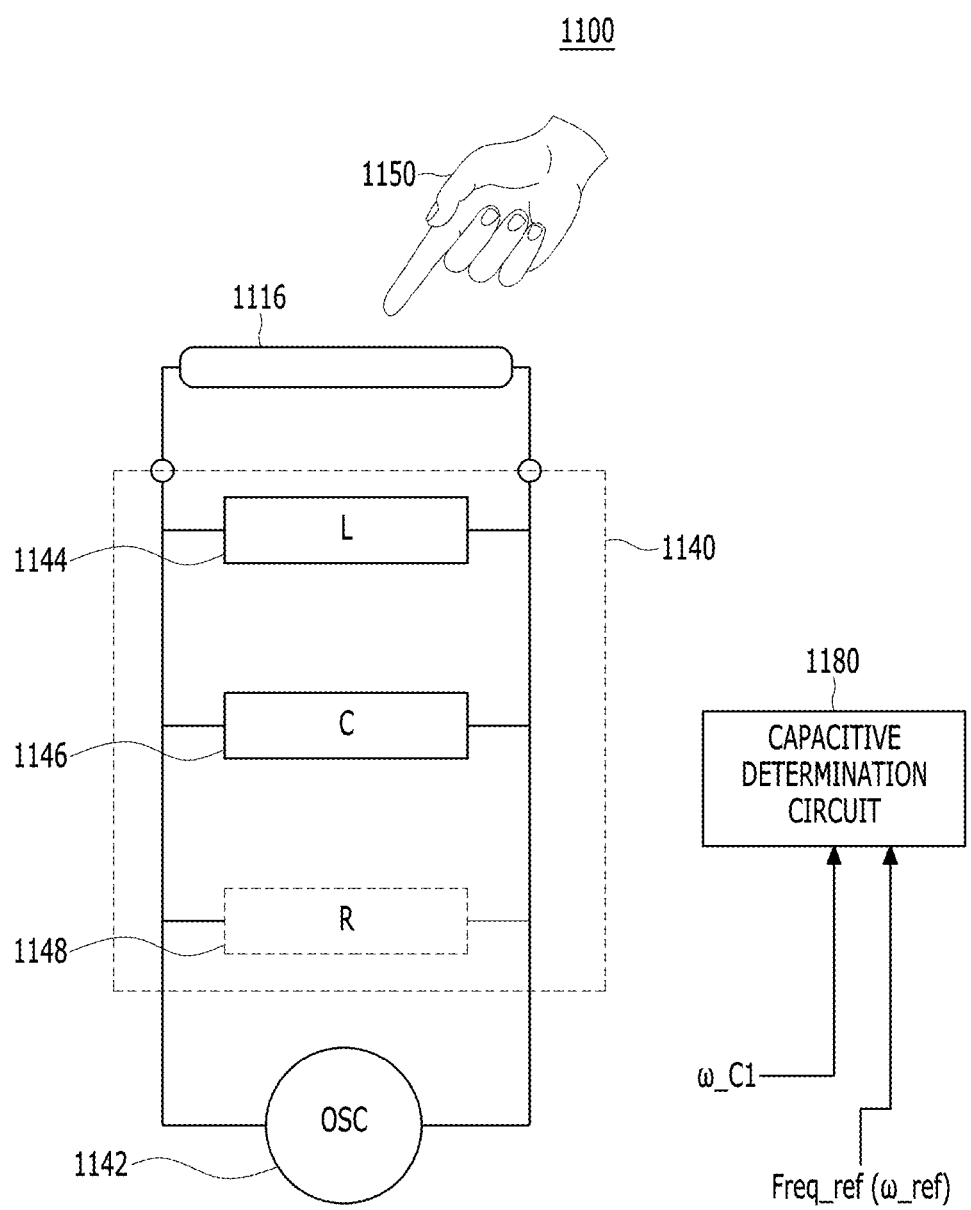
FIG. 12 is a view showing the circuit of a touch force sensor according to an embodiment of the present invention and a method of operating the same.
Figure 14:
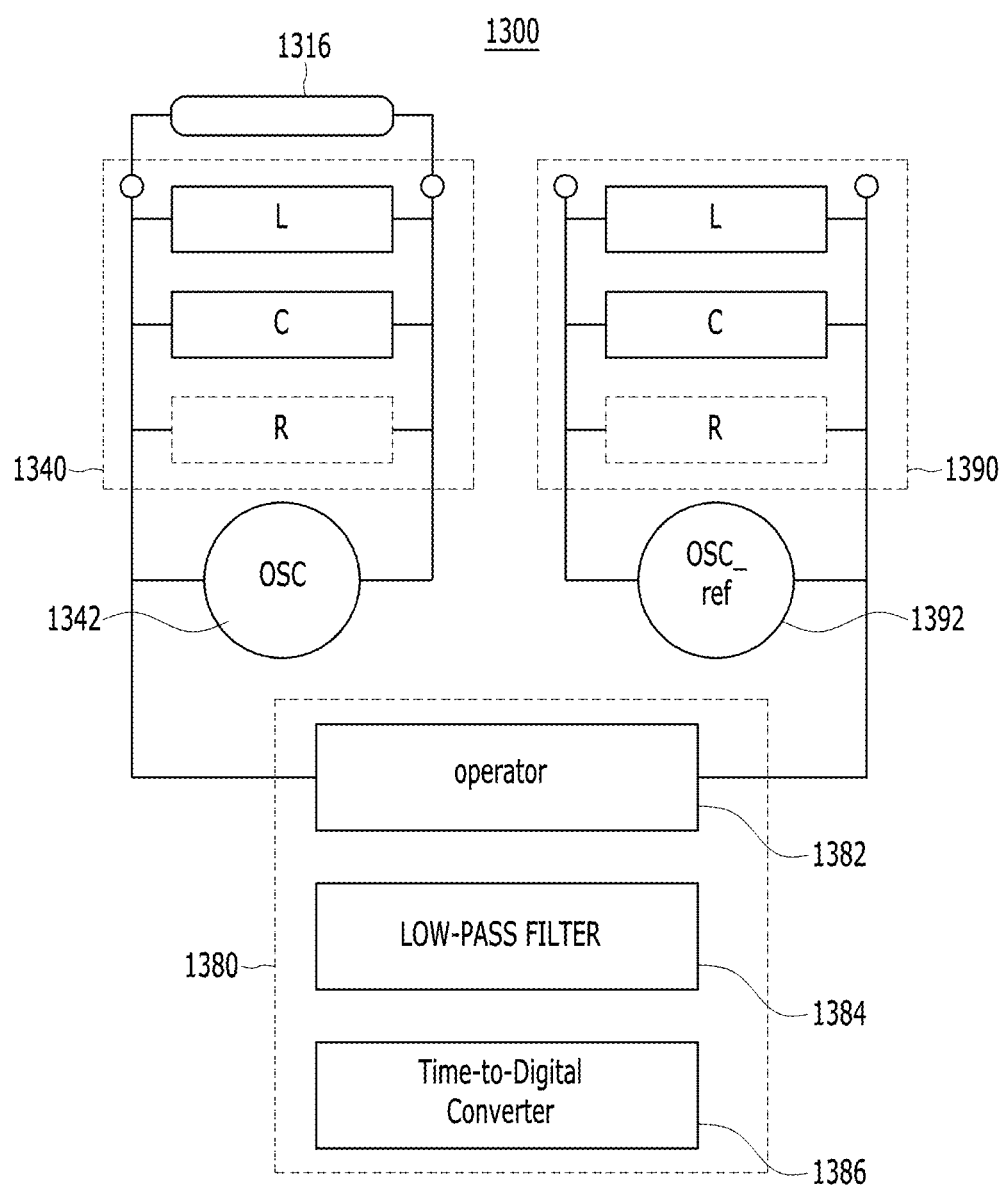
FIG. 14 is a view showing the circuit of a touch force sensor according to an embodiment of the present invention and a method of operating the same.

An embodiment of the capacitive determination circuit in the present invention is disclosed in detail in FIGS. 12 and 14.

In FIG. 2, the inductive coil 212 may be connected to an inductive determination circuit that detects a change in the inductance of the inductive coil 212 as shown in FIG. 1. An embodiment of the inductive determination circuit in the present invention is disclosed in detail in FIGS. 11 and 13.

Figure 3:
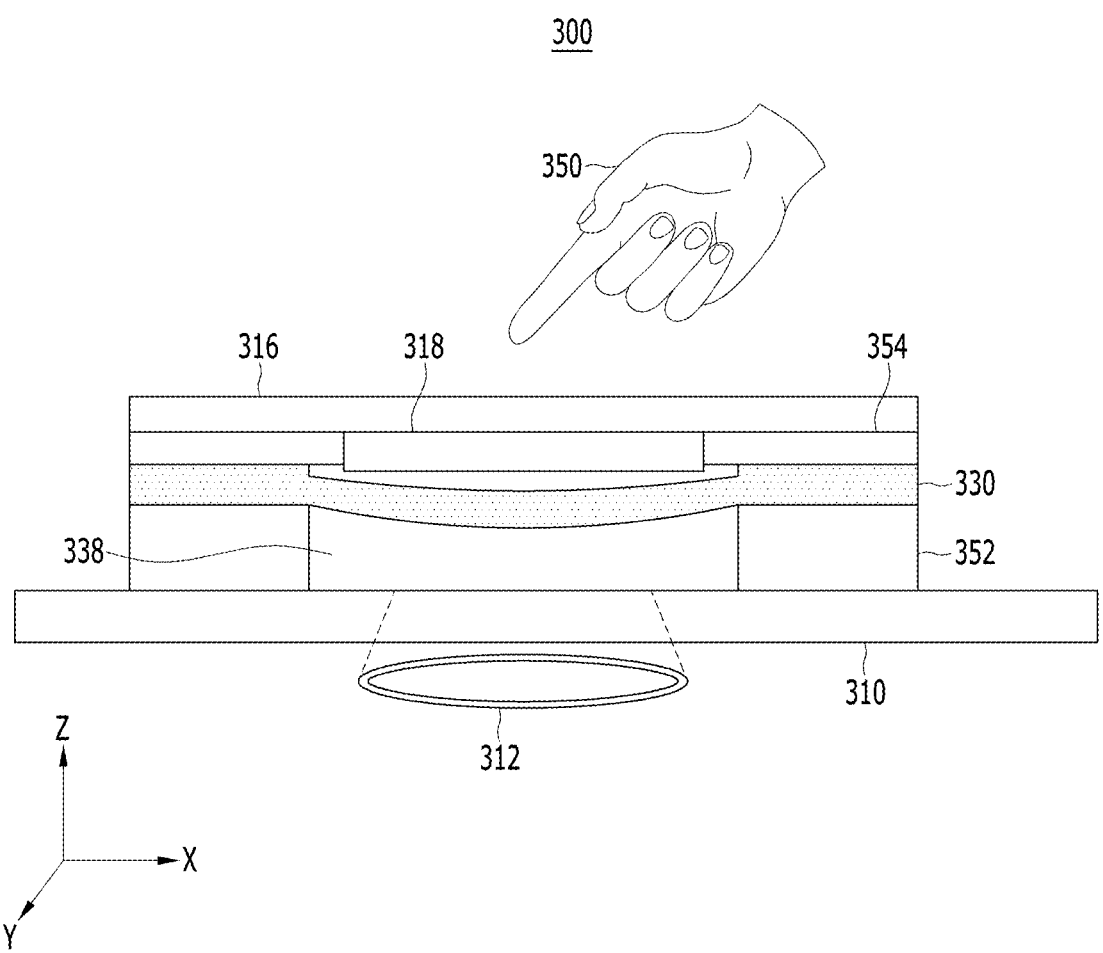
FIG. 3 is a diagram showing a touch force sensor according to an embodiment of the present invention.

FIG. 3 is a diagram showing a touch force sensor according to an embodiment of the present invention.

Since a PCB 310, an inductive coil 312, a deformable first part 330, an elastic foam 338, and a spacer layer 352, which correspond to the inductive sensing part of FIG. 3, are the same as the PCB 210, inductive coil 212, deformable first part 230, elastic foam 238, and spacer layer 252 of FIG. 2, respectively, redundant descriptions thereof will be omitted.

The touch electrode 316 and the dielectric layer/insulator layer 318 shown in FIG. 3 do not have elasticity. A spacer/elastic foam 354 disposed on the portion of the touch electrode 316 except for the portion on which the dielectric layer/insulator layer 318 is disposed is implemented using an elastic material. When an external force 350 is applied by an external finger, the touch electrode 316 and the dielectric layer/insulator layer 318 press the location of the center of the first part 330, thereby deforming the first part 330 so that the location of the center of the first part 330 approaches the inductive coil 312. Since the spacer layer 352 does not have elasticity, the first part 330 may not be deformed in an area where the first part 330 is in contact with the spacer layer 352.

In FIG. 3, the touch electrode 316 may be connected to a capacitive determination circuit that detects a change in the capacitance of the touch electrode 316 as shown in FIG. 1. An embodiment of the capacitive determination circuit in the present invention is disclosed in detail in FIGS. 12 and 14.

In FIG. 3, the inductive coil 312 may be connected to an inductive determination circuit that detects a change in the inductance of the inductive coil 312 as shown in FIG. 1. An embodiment of the inductive determination circuit in the present invention is disclosed in detail in FIGS. 11 and 13.

Figure 4:
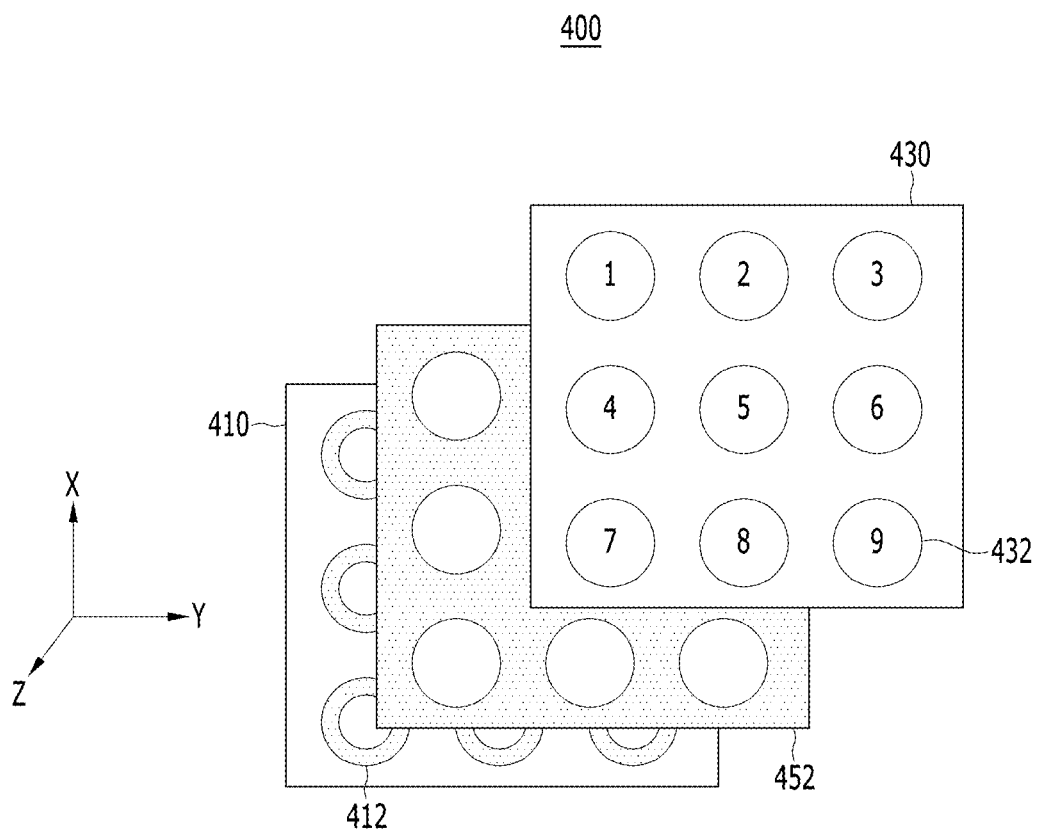
FIG. 4 is a diagram showing an embodiment of the inductive sensing part of FIG. 2 or 3.

FIG. 4 is a diagram showing an embodiment of the inductive sensing part of FIG. 2 or 3. In FIG. 4, there is shown a case where single channel sensors, each of which is the same as the single channel sensor 200 or 300 shown in FIG. 2 or 3, are arranged in an array or matrix form and implemented as multi-channel sensors.

The inductive sensing part of a touch force sensor 400 according to the present embodiment includes: a second part 430 exposed to an external force in a Z-axis direction, and configured to include a plurality of individual regions 432 elastically deformable in the Z-axis direction by the external force in the Z-axis direction; and a plurality of inductive coils 412 disposed to be movable in the Z-axis direction when at least one of the plurality of individual regions 432 of the second part 430 is deformed, formed on a substrate 410 spaced apart from the second part 430, configured to correspond to the plurality of individual regions 432, respectively, and disposed to be opposite to the plurality of individual regions 432, respectively.

The second part 430 may be made of an elastically deformable material, and the individual regions 432 may be made of the same material as the remaining area excluding the individual regions 432 of the second part 430. In other words, the second part 430 may surround the overall area of the touch force sensor 400, shown in FIG. 4, with a single outer cover, and thus the IP rating of the touch force sensor 400 may be increased. For example, given a smart watch in which the individual regions 432 have independent numbers as shown in FIG. 4, the individual regions 432 exposed from the smart watch are surrounded with a single outer cover, and thus excellent dustproof and waterproof performance is expected. The individual regions 432 are disposed to correspond to the holes of the spacer layer 452. Accordingly, when an external force is applied to any one or more of the individual regions 432, the corresponding region may be elastically deformed based on the elasticity of the second part 430. The holes of the spacer layer 452 may be filled with an elastic foam, as shown in FIGS. 2 and 3.

In an embodiment of the present invention, the individual regions 432 may be implemented using the completely same material as the remaining regions excluding the individual regions 432 of the second part 430. In another embodiment of the present invention, the individual regions 432 may be made of a material having higher electrical conductivity than that of the remaining regions of the second part 430, or an implementation may be made by attaching thin foils made of an electrically conductive material only onto portions corresponding to the individual regions 432 of the second part 430. In other words, the individual regions 432 may have higher electrical conductivity than the other regions of the second component 430, and effectively flow an eddy current to increase the sensitivity of inductive coupling.

Although not shown in FIG. 4, each of the individual regions 432 of FIG. 4 may be coupled to the touch electrode 216 or 316 and the dielectric layer/insulator layer 218 or 318 of FIG. 2 or 3.

In FIG. 4, each of the inductive coils 412 may be connected to an inductive determination circuit that detects a change in the inductance of each of the inductive coils 412, as shown in FIG. 1. An embodiment of the inductive determination circuit in the present invention is disclosed in detail in FIGS. 11 and 13.

In an embodiment of the present invention, the touch force sensor 400 of FIG. 4 may be located on the bezel, side, or back of a mobile device, and the individual regions 432 may have a small size and be densely arranged such that they are not identified by a user. In this case, the touch force sensor 400 may be utilized as a means for determining whether the user is holding the corresponding device or the user inputs a predetermined user gesture to the area of the touch force sensor 400 of the corresponding device.

In the conventional technologies, it was not easy to simultaneously detect the inductances of a plurality of channels. In the present invention, the inductances of a plurality of channels may be detected substantially at the time without time delay and quantified data may be obtained, and thus the spatial distribution of touch forces within the individual regions 432 covered by the multi-channel touch force sensor 400 may be obtained and the accurate intention of a user may be determined.

The individual regions 432 of the second part 430 may be made of a nonmagnetic metal or a magnetic metal. The individual regions 432 are preferably made of a conductor so that an eddy current can be generated therein. As described above, a thin foil made of a conductor is attached to the individual regions 432 to increase the sensitivity of the individual regions 432. Depending on whether the conductor of the individual regions 432 has magnetism, it may be determined whether the inductance increases or decreases when an external force in the Z-axis direction is applied. A material optimized for variables, such as whether the individual regions 432 are magnetic or non-magnetic and the inductance detection sensitivity to displacement based on the hardware design of channels, may be selected as the material of the individual regions 432.

Figure 5:
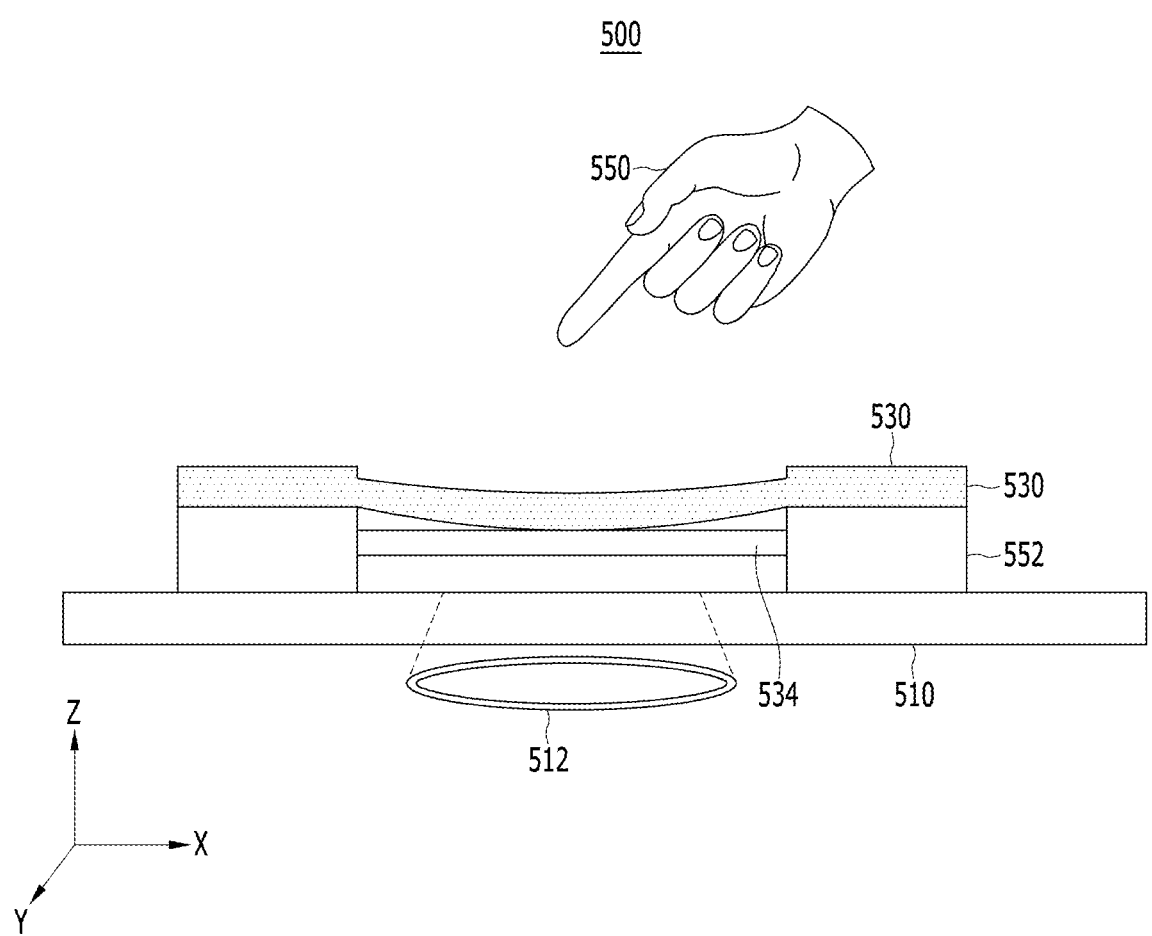
FIG. 5 is a diagram showing another embodiment of the inductive sensing part of FIG. 2 or 3.
Figure 6:
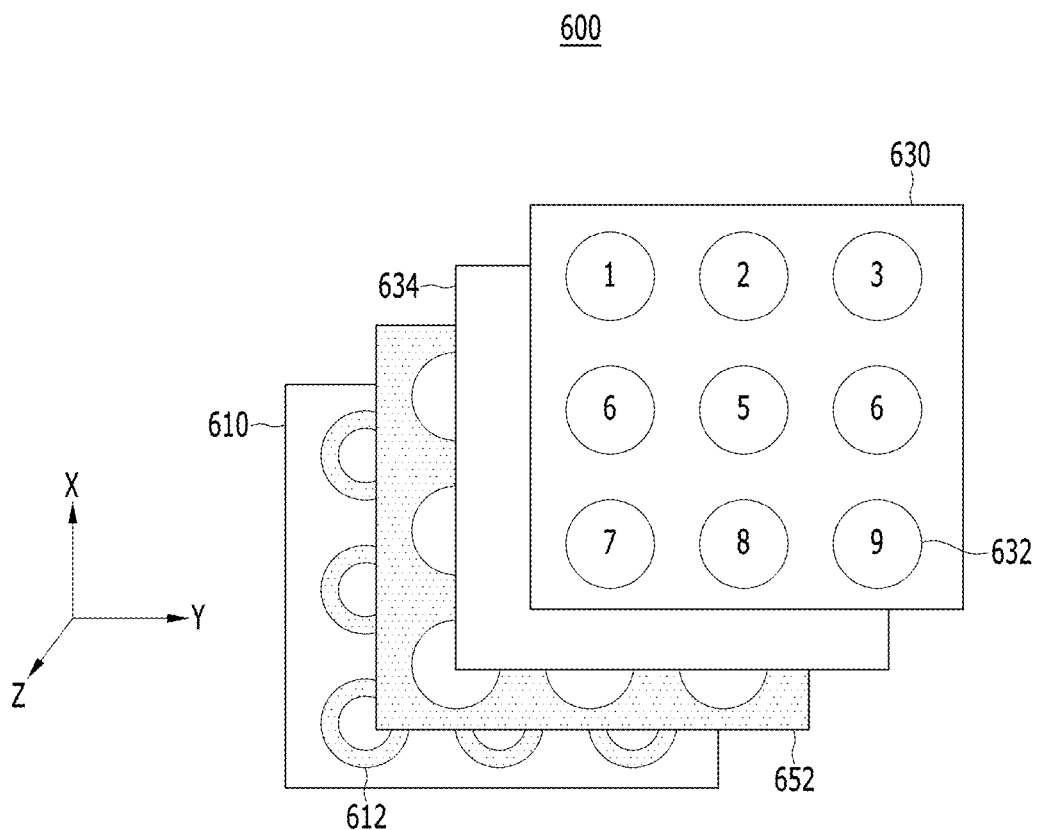
FIG. 6 is a diagram showing an embodiment of a multi-channel sensor including the inductive sensing part of FIG. 5.

Referring to FIGS. 2 to 4 together, since it is difficult to accurately measure the displacement of the first part 230 or 330 in the Z-axis direction attributable to an external force or the displacement in the Z-axis direction of the individual regions 432, the conventional inductive sensing technologies adopt a configuration in which a target layer 534 is separately disposed under a first part 530 as shown in FIGS. 5 and 6 to be described later as part of efforts to increase measurement accuracy. However, in the embodiments of the present invention, a change in inductance is detected through a difference in the resonant frequency of a differential signal by using the circuits of FIGS. 11 and 13, and thus it is easy to quantify and digitize a measured value, with the result that the sensitivity of displacement is high. Therefore, the one first part 230 or 330 may be applied to a single channel to detect and quantify the external force 250 or 350 in the Z-axis direction, as shown in FIGS. 2 and 3, and the displacement of each of the individual regions 432 in the Z-axis direction in the multi-channel may be directly detected to detect and quantify an external force in the Z-axis direction, as shown in FIG. 4.

In this case, depending on the distance between the first part 230 or 330 and the inductive coil 212 or 312 in the Z-axis direction, the inductance of a resonant circuit connected to the inductive coil 212 or 312 is varied by the inductive coupling between the first part 230 or 330 and the inductive coil 212 or 312. Accordingly, a change in inductance and a change in resonant frequency are detected only by the displacement of the first part 230 or 330 in the Z-axis direction, and the external force 250 or 350 in the Z-axis direction may be detected and quantified. In this case, when the first part 230 or 330 is deformed and an eddy current is induced in a portion made closer to the inductive coil 212 or 312, a change in resultant inductance attributable to the displacement of the first part 230 or 330 in the Z-axis direction is detected. The first part 230 or 330 may be implemented to have electrical conductivity because it is necessary to induce an eddy current.

Depending on the distance in the Z-axis direction between each of the individual regions 432 and an opposite one of the inductive coils 412, the inductance of an individual channel resonant circuit connected to each of the inductive coils 412 is also varied. Accordingly, an external force applied to one or a plurality of regions of the individual regions 432 may be detected and quantified based on a change in the inductance of the individual channel resonant circuit and a change in the resonant frequency of the individual channel resonant circuit.

FIG. 5 is a diagram showing another embodiment of the inductive sensing part of FIG. 2 or 3. Since the finger applying the external force 550, the substrate 510, the inductive coil 512, the first part 530, and the spacer layer 552 shown in FIG. 5 are the same as the finger applying the external force 250 or 350, the substrate 210 or 310, the inductive coil 212 or 312, the first part 230 or 330, and the spacer layer 252 or 352 shown in FIG. 2 or 3, respectively, redundant descriptions thereof will be omitted.

The inductive sensing part of the single channel sensor 500 of FIG. 5 further includes a target layer 534 that is disposed to be moved in a Z-axis direction based on the deformation of the first part 530. When the first part 530 is elastically deformed by the external force 550 applied in the Z-axis direction, the target layer 534 may be moved along the Z-axis direction according to the degree of deformation of the first part 530. In this case, the inductive coil 512 and the target layer 534 formed on the PCB 510 are inductively coupled.

In this case, a material having an elastic restoring force, e.g., an elastic foam, may be disposed between the target layer 534 and the inductive coil 512. When the external force 550 is applied, the target layer 534 approaches the inductive coil 512, and accordingly the inductance formed in the inductive coil 512 inductively coupled to the target layer 534 is varied. In other words, in the embodiment of FIG. 5, the target layer 534 inductively coupled to the inductive coil 512, instead of the first part 230 or 330 of FIG. 2 or 3, performs the function of detecting the external force 550.

In an embodiment of the present invention, the target layer 534 may be disposed for each channel separately from other channels, as shown in FIG. 5, or may be disposed in common for a group including a plurality of channels, as shown in FIG. 6 to be described later. In FIG. 5, there is shown an embodiment in which the target layer 534 is disposed for each individual channel and each channel is physically separated from other channels by the spacer layer 552.

The target layer 534 may be made of a non-magnetic metal or a magnetic metal. The target layer 534 is preferably made of a conductor so that an eddy current may be formed therein. Depending on whether the target layer 534 has magnetism, it may be determined whether inductance increases or decreases when the external force 550 is applied. A material optimized for variables, such as whether the target layer 534 is magnetic or non-magnetic and the inductance detection sensitivity to displacement based on the hardware design of channels, may be selected as the material of the target layer 534.

The target layer 534 may be implemented to be moved in the Z-axis direction by the external force 550 but to be maintained in parallel with the inductive coil 512. In an embodiment of the present invention, the target layer 534 may be moved while forming a slight inclination with the inductive coil 512 according to a location on the XY plane where the external force 550 is concentrated in the state of not being parallel to the inductive coil 512. In the conventional technologies, this is a factor of error in measurement, and this factor makes it difficult to accurately detect a touch force. In the present invention, a change in inductance may be precisely quantified based on the differential detection of inductance by the circuits of FIGS. 11 and 13 to be described later. Accordingly, it may be possible to accurately detect the touch force and, in an embodiment, it may also be possible to precisely detect a location on an XY plane where the external force (550) is concentrated.

In one of embodiments of the present invention, when a separate coil is not disposed in the target layer 534, the displacement of the target layer 534 may be measured in a self-inductive manner in such a way that the inductive coil 512 and the eddy current of the target layer 534 interact with each other.

According to another embodiment of the present invention, a mutual inductive coil (not shown) is disposed in the target layer 534, and the displacement of the target layer 534 may be measured in a mutual inductive manner in such a way that the mutual inductive coil of the target layer 534 and the inductive coil 512 on the substrate 510 interact with each other.

In FIG. 5, the inductive coil 512 may be connected to an inductive determination circuit that measures a change in the inductance of the inductive coil 512, as shown in FIG. 1. In the present invention, an embodiment of the inductive determination circuit is disclosed in detail in FIGS. 11 and 13.

Although not shown in FIG. 5, the first part 530 of FIG. 5 may be coupled to the touch electrode 216 or 316 and dielectric layer/insulator layer 218 or 318 of FIG. 2 or 3.

FIG. 6 is a diagram showing an embodiment of a multi-channel sensor including the inductive sensing part of FIG. 5.

Since the substrate 610, individual channel inductive coils 612, second part 630, individual regions 632, and spacer layer 652 of FIG. 6 are the same as the substrate 410, individual channel inductive coils 412, second part 430, individual regions 432, and spacer layer 452 of FIG. 4, respectively, redundant descriptions thereof will be omitted.

The target layer 634 may be disposed between the second component 630 and the spacer layer 652, and, in some cases, the spacer layer 652 may be implemented to have elasticity. In FIG. 6, the target layer 634 is disposed in common for a module including a plurality of individual regions 632 and inductive coils 612. Assuming that the spacer layer 652 also has a weak elastic restoring force, the target layer 634 is distorted in an XYZ space and provides an asymmetrical displacement to the inductive coils 612 depending on which of the individual areas 632 a touch force is applied to. For example, an inductance distribution formed in the inductive coils 612 when button No. 1 is pressed and an inductance distribution formed in the inductive coils 612 when button No. 6 is pressed will be different from each other. Such patterns may be tested in advance and may be stored by the controller of the touch force sensor 600. The touch force sensor 600 may extract an input intended by a user by comparing an inductance distribution, generated in the plurality of inductive coils 612 when an external force is actually applied, with the previously stored inductance distribution patterns.

In FIG. 6, each of the inductive coils 612 may be connected to an inductive determination circuit that measures a change in the inductance of the inductive coil 612, as shown in FIG. 1. In the present invention, an embodiment of the inductive determination circuit is disclosed in detail in FIGS. 11 and 13.

Although not shown in FIG. 6, each of the individual regions 632 of FIG. 6 may be coupled to the touch electrode 216 or 316 and the dielectric layer/insulator layer 218 or 318 of FIG. 2 or 3.

Figure 7:
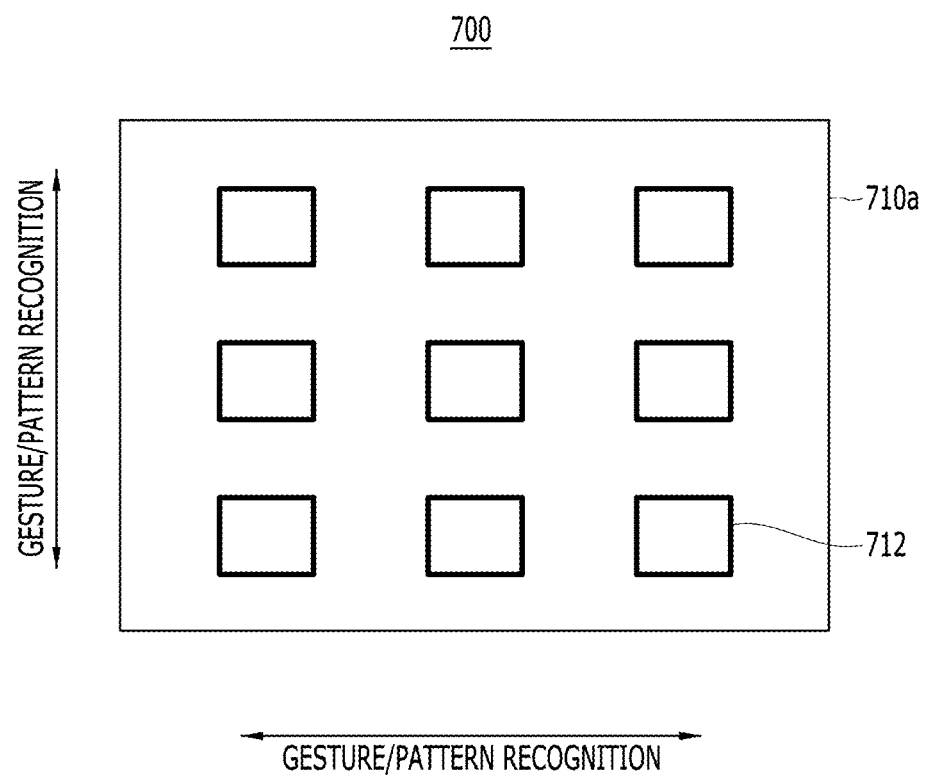
FIG. 7 is a diagram showing the multi-channel inductive sensing part of a touch force sensor according to an embodiment of the present invention and a method of operating the same.

FIG. 7 is a diagram showing the multi-channel inductive sensing part of a touch force sensor 700 according to an embodiment of the present invention and a method of operating the same.

Referring to FIG. 7, there is shown one module 710a as a set including a set of a plurality of coils 712 in the touch force sensor 700.

A pattern in which the touch force of a user changes temporally and spatially within the area covered by the module 710a may be tracked by tracking the spatial distribution of inductance on an XY plane generated in the plurality of coils 712 within the module 710a in a time domain.

The touch force sensor 700 may analyze the direction and speed in and at which the center of an external force moves on the XY plane in the time domain by tracking the spatial distribution of the external force in an Z-axis direction on the XY plane, recognized in individual regions covered by the plurality of respective coils 712, in the time domain. According to this, the touch force sensor 700 may recognize a pattern of touch force, i.e., a gesture of the user, such as tapping, sliding/scrolling/swiping, zooming in/zooming out, or the like, applied by a user in the area covered by the touch force sensor 700 by means of an inductive sensing technique.

The touch force sensor 700 may derive movement information on the XY plane in which the location of the center of touch force moves on the XY plane by combining X-axis movement information in which the location of the center of the touch force moves along the X-axis direction with Y-axis movement information in which the location of the center of the touch force moves along the Y-axis direction. In another embodiment, the touch force sensor 700 may obtain gesture information in which the location of the center of touch force moves on the XY plane directly from a pattern of varying touch force obtained in individual regions covered by the plurality of respective coils 712. Furthermore, respective pieces of channel information are independently obtained. Accordingly, the touch force sensor 700 may recognize a user gesture without confusion even when the user gesture is input through multi-touch within the sensing area covered by the plurality of coils 712.

In FIG. 7, each of the plurality of coils 712 may be connected to an inductive determination circuit (which will be described later in FIGS. 11 and 13) that detects a change in the inductance of each of the coils 712.

Figure 8:
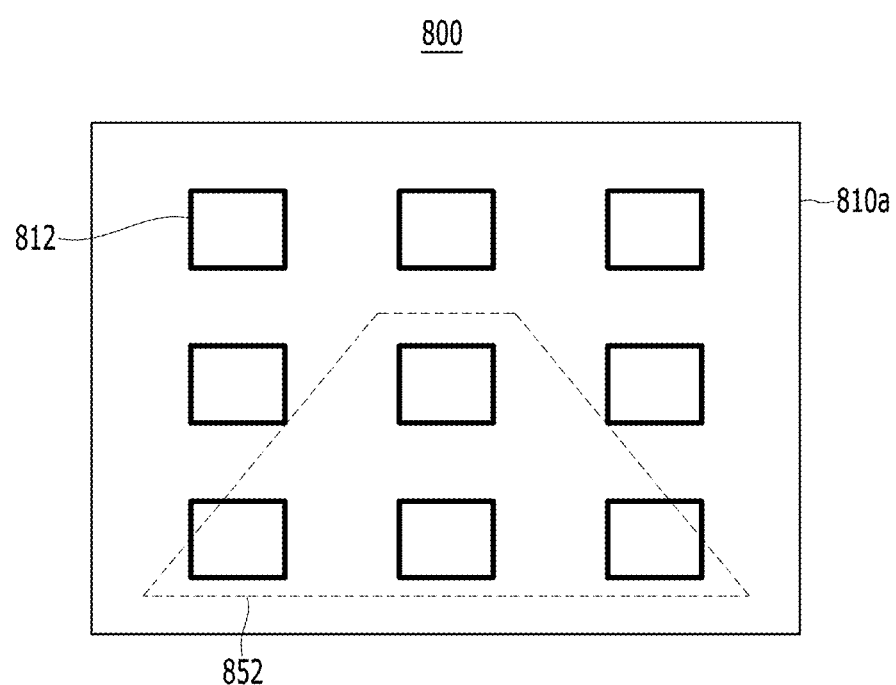
FIG. 8 is a diagram showing the multi-channel inductive sensing part of a touch force sensor according to an embodiment of the present invention and a method of operating the same.

FIG. 8 is a diagram showing the multi-channel inductive sensing part of a touch force sensor 800 according to an embodiment of the present invention and a method of operating the same.

Referring to FIG. 8, there is shown one module 810a as a set including a set of a plurality of coils 812 within the touch force sensor 800.

For example, in the case where the module 810a is an interface in which numbers are assigned to respective individual regions and exposed to the outside, when an external force is measured evenly to the extent that it is difficult to specify an individual region within a range 852 in which an external force is input, as shown in FIG. 8, it is not intended that a user touches a specific number area, but a measurement may be made to determine that the user simply holds the device or a pressure is applied from the outside due to a specific factor, thereby prevent the device from being erroneously operated.

For this purpose, it is necessary to detect an inductance distribution pattern at substantially the same time for the individual regions and the plurality of coils 812 included in the module 810a. In the present invention, this is achieved by detecting changes in inductance and the touch forces of the individual regions associated with the respective coils 812 based on differential resonant signals with respect to a reference inductance. In FIG. 8, each of the plurality of coils 812 may be connected to an inductive determination circuit that detects a change in the inductance of each of the coils 812. Descriptions related to inductance detection and determination will be given in conjunction with FIGS. 11 and 13 later.

Figure 9:
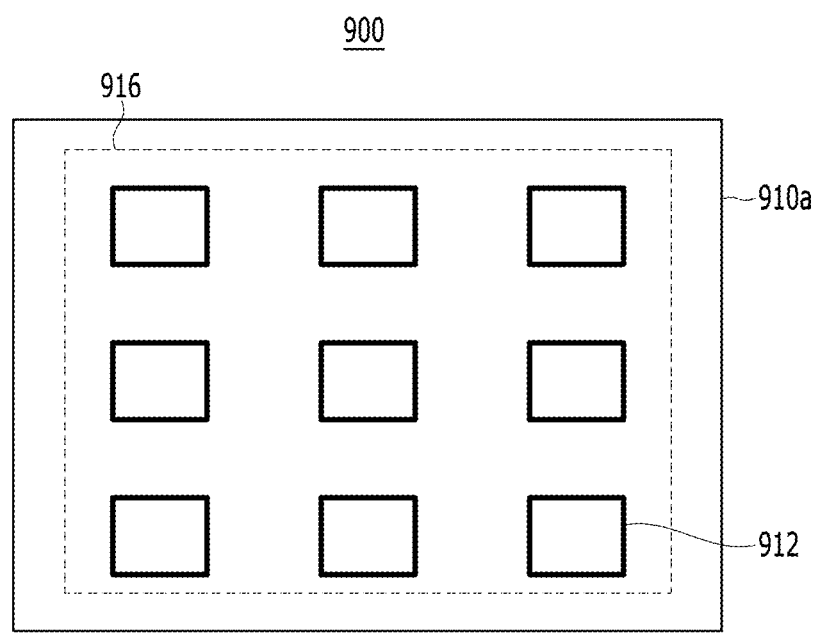
FIG. 9 is a diagram showing a multi-channel touch force sensor according to an embodiment of the present invention.

FIG. 9 is a diagram showing a multi-channel touch force sensor 900 according to an embodiment of the present invention.

In FIG. 9, one touch electrode 916 covers the area of a plurality of individual channel inductive coils 912, and one touch electrode 916 corresponds to one module 910a. One module 910a includes a plurality of channels.

In other words, the individual module 910a corresponds to one capacitive sensing module, the area of the one module 910a includes a plurality of individual channels, and each of the individual channels corresponds to one inductive coil 912 and an individual region opposite to the inductive coil 912.

When the embodiment of FIG. 9 is expanded, the first touch electrode of a touch force sensor 900 according to an embodiment of the present invention may cover a first group area including the plurality of individual region of a first group (corresponding to one module) among a plurality of individual regions, and the second touch electrode may include the plurality of individual regions of a second group among the plurality of individual regions.

In the embodiment of FIG. 9, the one touch electrode 916 provides a basis for determining whether a touch is made within the area of the module 910*a* or whether a touched finger is actually a human finger. In this case, a precise touch location and a touch force in the Z-axis direction are detected based on a change in the inductance of each of the plurality of coils 912. Furthermore, the intention and touch gesture of a user are based on a precise touch location, a spatial distribution of touch force in the Z-axis direction, and a spatial change in touch force in the Z-axis direction in the time domain, and are thus detected based on temporal and spatial changes in the inductance of each of the plurality of coils 912.

Figure 10:
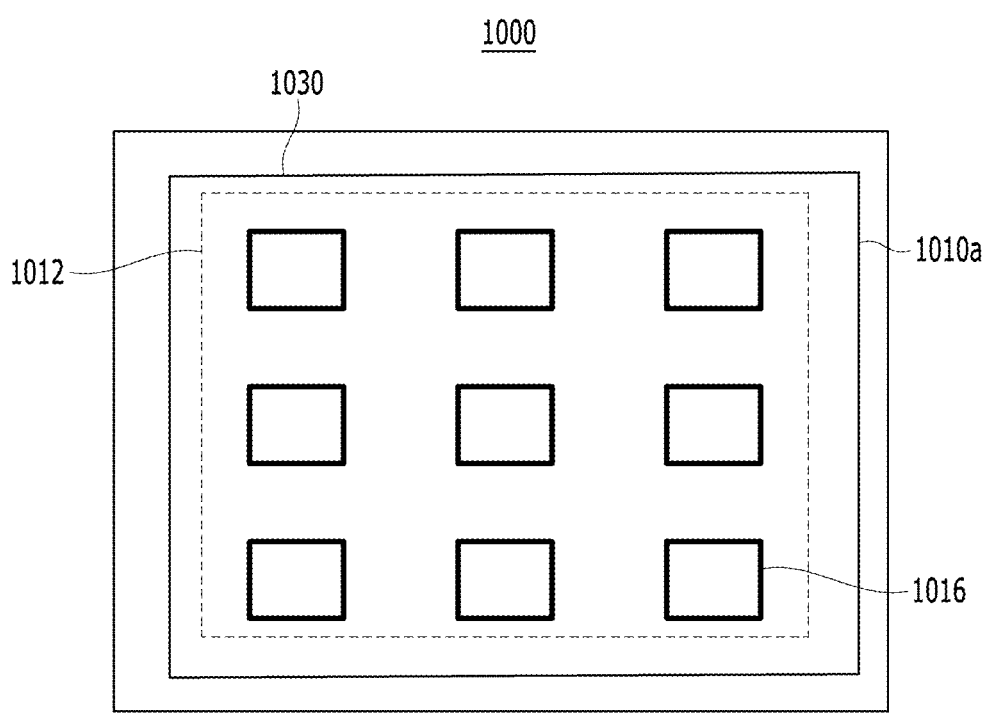
FIG. 10 is a diagram showing a multi-channel touch force sensor according to an embodiment of the present invention.

FIG. 10 is a diagram showing a multi-channel touch force sensor 1000 according to an embodiment of the present invention.

In FIG. 10, one inductive coil 1012 and one deformable part 1030 may correspond to one module 1010*a*, and may cover the area of a plurality of individual channel capacitive touch electrodes 1016. One capacitive touch electrode 1016 corresponds to one individual channel. One module 1010*a* includes a plurality of channels.

In other words, the individual module 1010*a* corresponds to one inductive sensing module, the area of the one module 1010*a* includes a plurality of individual channels, and each of the individual channels corresponds to one capacitive touch electrode 1016.

When the embodiment of FIG. 10 is expanded, the first individual area (individual coil area) of the touch force sensor 1000 according to the present embodiment may cover a third group area including the touch electrode locations of the plurality of touch electrodes of a third group among a plurality of touch electrodes, and the second individual area (individual coil area) may cover a fourth group area including the touch electrode locations of the plurality of touch electrodes of a fourth group among the plurality of touch electrodes.

In the embodiment of FIG. 10, the one inductive coil 1012 and the deformable component 1030 provide a basis for determining whether a touch is made within the area of the module 1010*a* and quantifying a touch force applied by a touched finger. In this case, a precise touch location is detected based on a change in the capacitance of each of the plurality of individual channel touch electrodes 1016.

Furthermore, the individual channel touch electrodes 1016 provide a basis for determining whether a touched finger is an actual human finger or whether a touch force is accidentally applied within the area of the module 1010*a* by some other object.

The intention of a user's touch and a touch gesture are determined based on temporal and spatial changes in the precise touch location, the quantified degree of touch force in the Z-axis direction, a change in touch force in the Z-axis direction in the time domain, and whether a touched finger is an actual human finger, and may thus be determined by considering a change in the inductance of the inductive coil 1012 corresponding to the module 1010*a* in the time domain and temporal and spatial changes in the capacitance of the individual channel touch electrodes 1016 within the module 1010*a* in an integrated manner.

Although the one deformable part 1030 is shown for the one module 1010*a* in FIG. 10, one target layer may be disposed between the deformable part 1030 and the inductive coil 1012 for each module 1010*a* in an embodiment.

Figure 11:
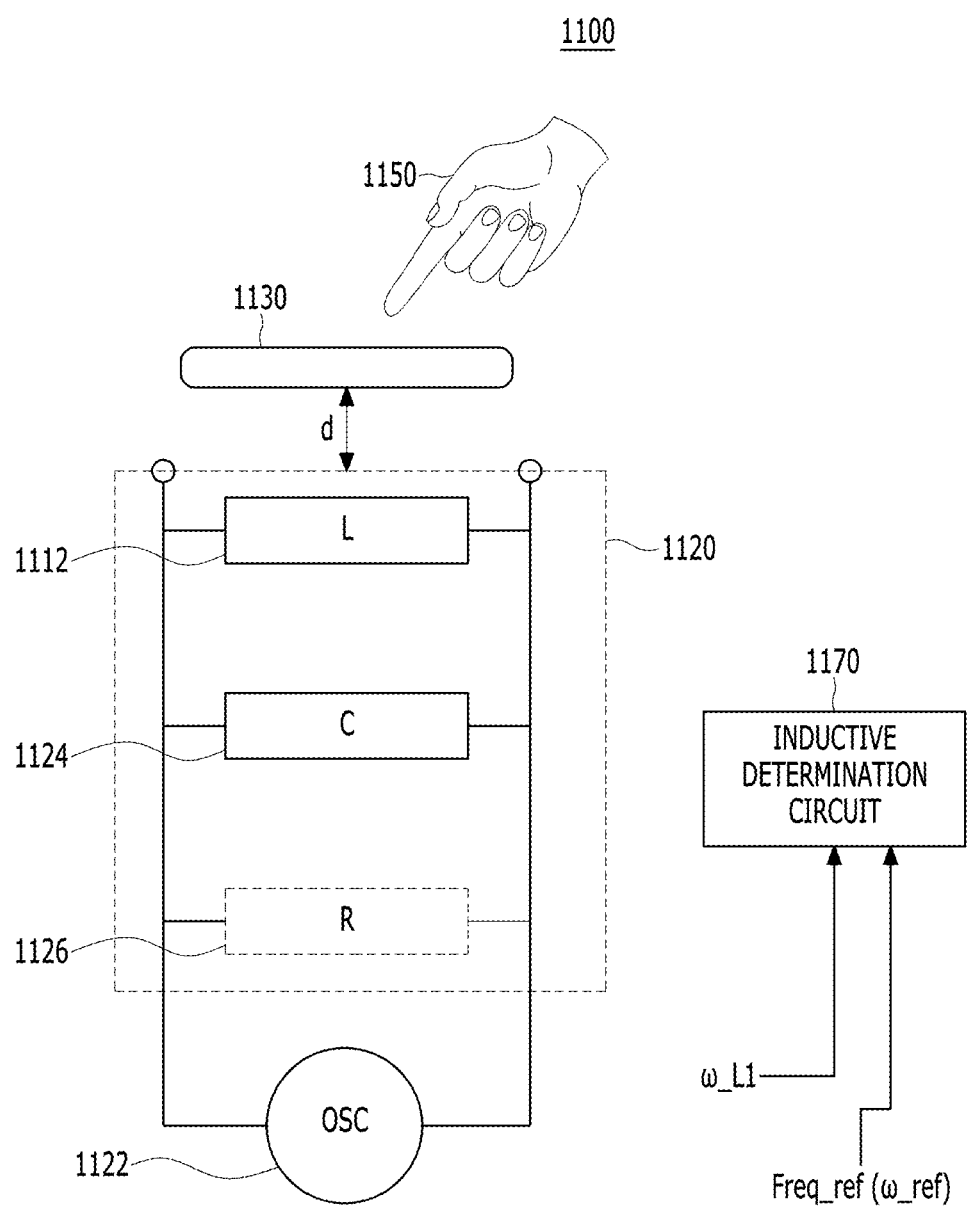
FIG. 11 is a diagram showing the circuit of a touch force sensor according to an embodiment of the present invention and a method of operating the same.

FIG. 11 is a diagram showing the circuit of a touch force sensor 1100 according to an embodiment of the present invention and a method of operating the same.

Referring to the touch force sensors 200 and 300 of FIGS. 2 and 3 and the circuit of FIG. 11 according to one embodiment of the present invention together, the touch force sensor 200, 300 or 1100 includes a first inductive channel resonant circuit 1120 coupled to the inductive coil 212, 312 or 1112 and configured to have a first inductive resonant frequency $\omega\_L1$ attributable to a first inductance formed in the inductive coil 212, 312 or 1112 based on the displacement of the deformable first part 230, 330 or 1130 relative to the inductive coil 212, 312 or 1112.

In this case, the touch force sensor 200, 300 or 1100 according to the embodiment of the present invention includes: a second oscillator 722 configured to apply a second AC signal to the first inductive channel resonant circuit 1120; a reference resonant circuit (not shown in FIG. 11) configured to have the same impedance as a predetermined first one (as which a state in which the external force 250, 350 or 1150 is not applied is preferred) of the states that the first inductive channel resonant circuit 1120 may have; a reference oscillator (not shown in FIG. 7) configured to have the same characteristics as the second oscillator 1122 and to apply a reference AC signal to the reference resonant circuit; and an inductive determination circuit 1170 configured to receive a second electric signal formed in the first inductive channel resonant circuit 1120, to receive a reference electric signal formed in the reference resonant circuit, and to determine the displacement $\Delta d = |d - d0|$ of the first part 230, 330 or 1130 and the external force 250, 350 or 1150 in the Z-axis direction based on the first inductive resonant frequency $\omega\_L1$ of the second electric signal and the reference resonant frequency $\omega\_{ref}$ of the reference electric signal.

The inductive determination circuit 1170 of the touch force sensor 200, 300 or 1100 according to an embodiment of the present invention may detect the difference between the reference resonant frequency $\omega\_{ref}$ of the reference electric signal, formed in the reference resonant circuit under the influence of the reference AC signal applied to the reference resonant circuit, and the first inductive resonant frequency $\omega\_L1$, and may obtain the extent to which the first inductive channel resonant circuit 1120 deviates from the first state, the relative displacement $\Delta d = |d - d0|$ by which the first part 230, 330 or 1130 has been moved relative to the inductive coil 212, 312 or 1112, and quantified detection information for the external force 250, 350 or 1150 in the Z-axis direction based on the difference between the reference resonant frequency $\omega\_{ref}$ and the first inductive resonant frequency $\omega\_L1$.

The first inductive channel resonant circuit 1120 shown in FIG. 11 is illustrated as an equivalent circuit, and does not necessarily include a lumped RLC element. For example, a capacitance C 1124 and a resistor R 1126 may be independent elements, and may represent parasitic components. Furthermore, even when the first inductive channel resonant circuit 1120 is implemented using independent elements, the arrangement of elements does not necessarily follow FIG.

11, and it is sufficient if the arrangement of elements equivalently corresponds to the first inductive channel resonant circuit 1120.

When the difference between the reference resonant frequency $\omega\_ref$ and the first inductive resonant frequency $\omega\_L1$ is equal to or larger than a first threshold value, the inductive determination circuit 1170 of the touch force sensor 200, 300, 1100 according to an embodiment of the present invention may determine that the external force 150 in the Z-axis direction has been input by considering that the first inductive resonant frequency $\omega\_L1$ has caused a significant change. In other words, when a change in the first inductive resonant frequency $\omega\_L1$ is detected due to noise, unintended movement, unintended contact, or unintended vibration but is smaller than the first threshold value, it may be considered that the first inductive resonant frequency $\omega\_L1$ has not caused a significant change.

The inductive determination circuit 1170 of the touch force sensor 200, 300 or 1100 according to an embodiment of the present invention may perform a calibration process. The inductive determination circuit 1170 may perform a calibration process in the first state (as which, for example, a state in which external force 250, 350 or 1150 is not applied is preferred). In this case, the first inductive channel resonant circuit 1120 or reference resonant circuit may be adjusted such that the difference between the first inductive resonant frequency $\omega\_L1$ and the reference resonant frequency $\omega\_ref$ becomes zero through a calibration process. Furthermore, through the calibration process, the difference between the first inductive resonant frequency $\omega\_L1$, detected in the first state in which the external force 250, 350 or 1150 is not applied, and the reference resonant frequency $\omega\_ref$ may be stored in separate memory or storage, and may be processed as offset information in a future inductive force sensing process. After the calibration, the adjustment of the difference between the first inductive resonant frequency $\omega\_L1$ and the reference resonant frequency $\omega\_ref$ may be performed using a means for adjusting the value of a variable resistor R' that may be added to the first inductive channel resonant circuit 1120, or the like.

In general, the inductive sensing technology known so far is configured to measure a change in impedance after sequentially inputting a plurality of frequency signals through a variable frequency scan. This method has a precondition that it is necessary to accurately detect and compare the magnitudes of signals. However, it is very difficult to accurately detect the size of signals despite noise in a general inductive sensor.

The present invention mainly targets changes in resonant frequency instead of the amplitudes of signals for detection. Furthermore, the present invention may achieve a desired purpose sufficiently by means of applying AC signals of the same frequency without adopting a method such as variable frequency scanning. Accordingly, by using this method, the present invention may rapidly detect and quantify a change in inductance at a corresponding time point. A real-time change in the first inductive resonant frequency $\omega\_L1$ may be detected regardless of the amplitude of a resonant signal by the method of FIG. 13 to be described later. Furthermore, since the first inductive resonant frequency $\omega\_L1$ is not detected indirectly but the value of the frequency is directly detected, advantages arise in that it is easy to digitize the detected value and changes in inductance and touch force may be accurately detected using the digitized value. In addition, since there is no process such as variable frequency scanning, a sensing process is fast and power consumption is low. Since an inductive sensing process for one coil and channel is rapid and a sensing result is obtained as a digitized value, it may be possible to detect changes in inductance and touch force at substantially the same time even when multiple channels are implemented. When each channel and its corresponding coil correspond to a location on an XY plane, a spatial change in rapidly obtained touch force in the XY plane allows whether the touch force is generated due to a user's intention, an error, or another cause to be easily identified. In addition, a gesture made by a user's intention may be easily recognized by tracking a spatial change in touch force on the XY plane in a time domain.

Referring to the circuit of FIG. 11 together with the embodiment of FIG. 4 to describe another embodiment of the present invention, it may be understood that the individual regions 432 of FIG. 4 correspond to the first part 1130 of FIG. 11. In this case, it is understood that the inductive coils 412 of the individual inductive channels corresponding to the respective individual regions 432 correspond to the coils 1112 of FIG. 11. The inductive channel resonant circuit 1120 of FIG. 11 is coupled to the inductive coil 412 of the individual inductive channel, and is used as a means for sensing an external force 1150 for the individual inductive channel. The oscillator 1122 of FIG. 11 is provided for each individual inductive channel, and applies an individual inductive AC signal to the inductive channel resonant circuit 1120 of the individual inductive channel.

The inductive determination circuit 1170 and the reference resonant circuit may be connected in common to the resonant circuits 1120 of a plurality of individual inductive channel, and the plurality of individual inductive channels may share the inductive determination circuit 1170 and the reference resonant circuit.

The present invention may immediately detect a change in the resonant frequency of the individual inductive channel by a single scan without the process of scanning the frequency of an AC signal. Accordingly, the inductive determination circuit 1170 and the reference resonant circuit may be cross-connected with the plurality of individual inductive channel resonant circuits 1120 in a time division manner, and the resonant frequency information of the individual inductive channels output from the plurality of individual inductive channel resonant circuits 1120 may be detected by the inductive determination circuit 1170 and used to detect an external force for the individual inductive channels/individual regions 432. In other words, since the detection time of the external force for the individual inductive channel has been considerably shortened, the output information (quantitative information about the resonant frequency for each channel) of a plurality of individual inductive channels is transmitted to the shared inductive determination circuit 1170 through time division multiplexing, and the inductive determination circuit 1170 may detect individual displacement information of each of the plurality of individual inductive channels and touch force information while identifying each of the plurality of individual inductive channels.

Even when identifying a touch of a human finger and a gesture made by a series of touch movements, the inductive determination circuit 1170 may recognize location information for each inductive channel, and may calculate a spatial distribution of touch force at substantially the same time (meaning that the time is substantially the same when compared to the duration of a touch of a human finger). Accordingly, it may be possible to recognize a user gesture intended by an external force in the Z-axis direction in combination with the embodiments of FIGS. 7 to 10 described above. In addition, it may possible to identify whether an external force in the Z-axis direction is an input intended by a user in a similar manner.

Although the inductive determination circuit 1170 and the reference resonant circuit are disposed for one module associated with a plurality of individual channels or one inductive determination circuit 1170 and one reference resonant circuit are implemented in common for an overall chip, the distribution of touch force of the individual inductive channels may be measured at substantially the same time without time delay.

FIG. 12 is a view showing the circuit of a touch force sensor 1100 according to an embodiment of the present invention and a method of operating the same.

The touch force sensor 1100 according to the present embodiment includes: a first capacitive channel resonant circuit 1140 connected to a touch electrode 1116 disposed in a contact portion (not shown) with which a finger comes into contact; a first oscillator 1142 configured to apply a first AC signal to the first capacitive channel resonant circuit 1140; and a capacitive determination circuit 1180 configured to detect the first capacitive resonant frequency $\omega\_C1$ of a first electric signal formed in the first capacitive channel resonant circuit 1140, and to determine whether a finger comes into contact with the contact portion and a finger that comes into contact with the contact portion is a human finger based on the detected first capacitive resonant frequency $\omega\_C1$.

In this case, when the difference between the reference resonant frequency $\omega\_ref$ and the first capacitive resonant frequency $\omega\_C1$ is equal to or larger than a second threshold value, the capacitive determination circuit 1180 may determine that a finger comes into contact with the contact portion by considering the first capacitive resonant frequency $\omega\_C1$ has caused a significant change.

In this case, the capacitive determination circuit 1180 may determine whether a finger that comes into contact with the contact portion is a human finger based on whether the difference between the reference resonant frequency $\omega\_ref$ and the first capacitive resonant frequency $\omega\_C1$ is equal to or larger than a third threshold value.

In this case, in the state in which the first capacitive channel resonant circuit 1140 has been externally and forcibly adjusted to a second state having the same impedance as the reference resonant circuit, the capacitive determination circuit 1180 may perform a calibration process based on the difference between the first capacitive resonant frequency $\omega\_C1$ and the reference resonant frequency $\omega\_ref$. The second state may be a state in which a finger comes into contact with or in proximity to the contact portion. In this case, the first capacitive channel resonant circuit 1140 may be adjusted such that the difference between the first capacitive resonant frequency $\omega\_C1$ and the reference resonant frequency $\omega\_ref$ becomes zero through a calibration process. Furthermore, through the calibration process, the difference between the first capacitive resonant frequency $\omega\_C1$, detected in the state in which a finger does not come into contact with or in proximity to the contact portion, and the reference resonant frequency $\omega\_ref$ may be stored in separate memory or storage, and may be processed as offset information in a future channel-based capacitance detection process. After the calibration, the adjustment of the first capacitive channel resonant circuit 1140 may be performed using a means for adjusting the value of a variable resistor R' or the like.

The resultant impedance into which the impedance of the first capacitive channel resonant circuit 1140 and a parasitic capacitance are combined changes due to a change in the parasitic capacitance formed between a human finger, approaching from the outside, and the touch electrode 1116.

The capacitive determination circuit 1180 may have a plurality of reference values for the resonant frequency of the capacitive channel. In this case, the reference values may refer to the boundary values of the first range of the first capacitive resonant frequency $\omega\_C1$ in the case where an external finger does not come into contact with or in proximity to the contact portion, the second range of the first capacitive resonant frequency $\omega\_C1$ in the case where an external finger comes into contact with or in proximity to the contact portion, the third range of the first capacitive resonant frequency $\omega\_C1$ in the case where an external object that comes into contact with or in proximity to the contact portion is not a human body, and the fourth range of the first capacitive resonant frequency $\omega\_C1$ in the case where an external object that comes into contact with or in proximity to the contact portion is an actual human body.

When the shift of the resonant frequency of the capacitive channel (the difference with the reference resonant frequency) attributable to the approach of an external object to the capacitive channel is equal to or larger than a second threshold value, it may be considered that the resonant frequency of the capacitive channel has caused a significant shift, and thus it may be recognized that an object comes into contact with or in proximity to the contact portion.

When the shift of the resonant frequency of the capacitive channel (the difference with the reference resonant frequency) attributable to the approach of an external object to the capacitive channel is equal to or larger than a third threshold value, it may be recognized that an external object that comes into contact or in proximity is a human finger. In this case, when a touch force is recognized in both a capacitive channel and an inductive channel that is spatially identical to or overlaps the capacitive channel, it may be recognized that the force is an effective touch force.

For example, if reference can be made to a database for the fact that the shift of the resonant frequency of the capacitive channel (a difference with the reference resonant frequency) works within the range of 100 to 1000 kHz when a human finger approaches, it may be recognized that the shift of the resonant frequency of the capacitive channel outside the above range does not correspond to a touch of a human body. Alternatively, assuming that a human finger induces the resonant frequency shift of a capacitive channel of 100 to 1000 kHz and a known touch mechanism such as a stylus induces the resonant frequency shift of a capacitive channel of 20 to 50 kHz, it may be recognized that a shift in a range other than these ranges does not correspond to a user's intended touch, and thus the touch force detection information of the inductive channel at the same time as this time may be determined to be invalid and then be canceled. It will be apparent that these embodiments are some of embodiments for implementing the spirit of the present invention, and the spirit of the present invention is not limited to these embodiments.

In an embodiment of the present invention, even when the shift of the resonant frequency of a capacitive channel is recognized, the shift of the resonant frequency may be immediately recognized by a single scan process without requiring a variable frequency scan, so that the type of object that comes into contact or in proximity is rapidly recognized and thus it may be possible to rapidly prevent the device from being erroneously operated by misunderstanding the touch force of the inductive channel. Furthermore, the recognition of the shift of the resonant frequency by a single scan may identify only a frequency component without requiring the measurement of the amplitude of the resonant signal and thus it is robust to noise and robust to a weak change in a signal.

The first capacitive channel resonant circuit 1124 shown in FIG. 12 is illustrated as an equivalent circuit, and does not necessarily include a lumped RLC element. For example, a capacitance C 1146 and a resistor R 1148 may be independent elements, and may represent parasitic components. Furthermore, even when the first capacitive channel resonant circuit 1140 is implemented using independent elements, the arrangement of elements does not necessarily follow FIG. 12, and it is sufficient if the arrangement of elements equivalently corresponds to the first capacitive channel resonant circuit 1140.

Referring to the circuit of FIG. 12 together with the embodiment of FIG. 4 to describe another embodiment of the present invention, it may be understood that the touch electrodes of the individual channels coupled to the individual regions 432 of FIG. 4 correspond to the touch electrode 1116 of FIG. 12.

The oscillator 1142 of the individual channel is disposed for the resonant circuit 1140 of the individual channel, and applies the AC signal of the individual channel to the resonant circuit 1140 of the individual channel.

The capacitive determination circuit 1180 and the reference resonant circuit are connected in common to the resonant circuits 1140 of a plurality of individual channels, and the shifts of the individual channel resonant frequencies of the resonant circuits 1140 of the plurality of individual channels may be detected through time division multiplexing. Although the capacitive determination circuit 1180 and the reference resonant circuit are disposed for one module associated with a plurality of individual channels or one capacitive determination circuit 1180 and one reference resonant circuit are implemented in common for an overall chip, whether a touch occurs in each of the plurality of individual capacitive channels, whether a touched object is a human finger, a stylus or the like, and whether an input in question is an intended input may be measured at substantially the same time without time delay.

The touch force sensor 1100 according to an embodiment of the present invention may be described with reference to FIGS. 11 and 12 together.

In this case, in the touch force sensor 1100 according to an embodiment of the present invention, the inductive determination circuit 1170 and the capacitive determination circuit 1180 may share one reference resonant circuit. A reference oscillator configured to apply a reference AC signal is independently coupled to the reference resonant circuit.

The capacitive determination circuit 1180 may detect the difference between the reference resonant frequency $\omega\_ref$ of a reference electric signal, formed in the reference resonant circuit under the influence of the reference AC signal applied to the reference resonant circuit, and the first capacitive resonant frequency $\omega\_C1$, and may determine whether a finger comes into contact with the contact portion/touch electrode 1116 and whether a finger that comes into contact with the contact portion/touch electrode 1116 is a human finger based on the difference between the reference resonant frequency $\omega\_ref$ and the first capacitive resonant frequency $\omega\_C1$. The inductive determination circuit 1170 may detect the difference between the reference resonant frequency $\omega\_ref$ and the first inductive resonant frequency $\omega\_L1$, and may determine the displacement of the first part 1130 and the external force 1150 in the Z-axis direction based on the difference between the reference resonant frequency $\omega\_ref$ and the first inductive resonant frequency $\omega\_L1$.

In this case, in the touch force sensor 1100 according to an embodiment of the present invention, when a human finger comes into contact with the contact portion/touch electrode 1116 from the outside and the external force in the Z-axis direction is applied by the contact of the finger, the capacitive determination circuit 1180 may detect the touch location of the finger, the inductive determination circuit 1170 may detect the touch location of the finger, or the capacitive determination circuit 1180 and the inductive determination circuit 1170 may detect and cross-validate the touch location of the finger. In other words, since the touch location of the finger is recognized from the inductive channel and the capacitive channel, the touch location of the finger may be recognized based on one of the two types of information, or the touch location of the finger recognized from the inductive channel and the touch location of the finger recognized from the capacitive channel may cross-validate each other.

The reference resonant circuit may be designed to have the same impedance as a predetermined first state of the states that the first inductive channel resonant circuit 1120 may have and the same impedance as a predetermined second state of the states that the first capacitive resonant circuit 1140 may have. In this case, the first state may be a state in which the external force 1150 in the Z-axis direction is not applied, and the second state may be a state in which a finger does not come into contact with the contact portion.

Reference may be made to the touch force sensor 1100 according to another embodiment of the present invention together with the multi-channel structure of FIG. 4. In other words, referring to FIGS. 4, 11, and 12 together, one reference resonant circuit and one reference oscillator may be shared for a plurality of individual inductive channels and individual capacitive channels.

The reference resonant circuit may be shared by the capacitive determination circuit 1180 and the inductive determination circuit 1170, the capacitive determination circuit 1180 may be shared by a plurality of individual capacitive channels, and the inductive determination circuit 1170 may be shared by a plurality of individual inductive channels.

Figure 13:
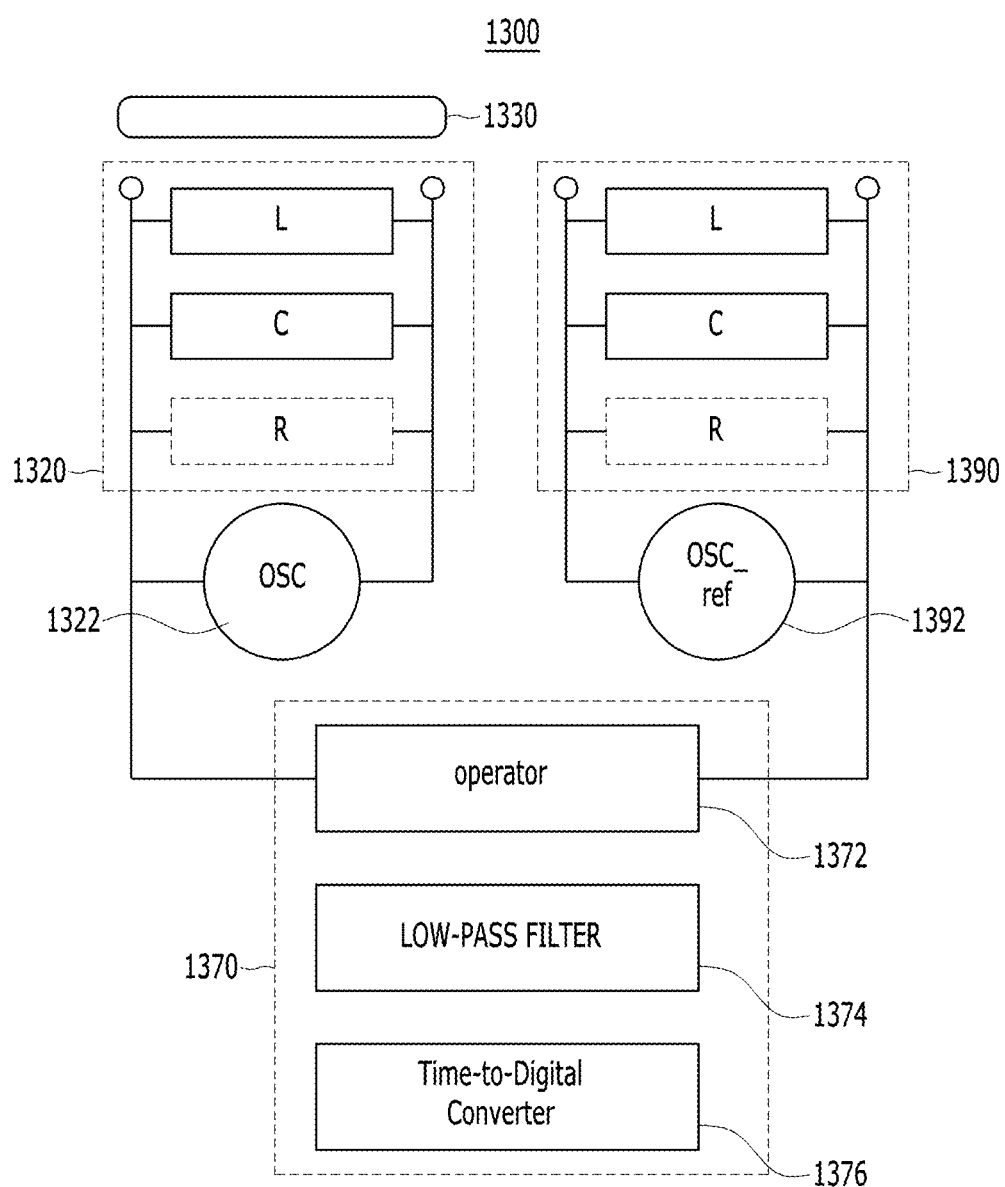
FIG. 13 is a view showing the circuit of a touch force sensor according to an embodiment of the present invention and a method of operating the same.

FIG. 13 is a view showing the circuit of a touch force sensor 1300 according to an embodiment of the present invention and a method of operating the same.

Since the first inductive channel resonant circuit 1320, oscillator 1322, and first part 1330 of FIG. 13 are the same as the first inductive channel resonant circuit 1120, oscillator 1122, and first part 1130 of FIG. 11, respectively, redundant descriptions thereof will be omitted.

The inductive determination circuit 1370 of the touch force sensor 1300 according to an embodiment of the present invention may include: an operator 1372 configured to obtain the difference between the first inductive resonant frequency $\omega\_L1$ and the reference resonant frequency $\omega\_ref$; a low-pass filter 1374 connected to the output terminal of the operator 1372, and configured to remove a high-frequency component; and a time-to-digital converter 1376 connected to the output terminal of the low-pass filter 1374, and configured to digitally count the frequency of a differential frequency component signal corresponding to the difference between the first inductive resonant frequency $\omega\_L1$ and the reference resonant frequency $\omega\_ref$ (output a digitized value proportional to the frequency of the differential frequency component signal).

The operator 1372 may immediately obtain a differential frequency component signal by using arithmetic operations (addition, subtraction, and multiplication) between a second electric signal and a reference electric signal. The time-to-digital converter 1376 may count the number of pulses of a pulse signal having a differential frequency (or a frequency proportional to the differential frequency) over a predetermined time interval, and may generate a digital count value for the pulse width or period of a pulse signal having a differential frequency (or a frequency proportional to the differential frequency).

In an embodiment, the inductive determination circuit 1370 may have a sampler and a comparator for the differential frequency component signal. In this case, to achieve the smooth operation of the inductive determination circuit 1370, the sampler and the comparator may be designed by selecting an operating frequency that is sufficiently higher than a first threshold value and sufficiently higher than the operating range of resonant frequency components corresponding to detection target displacements. In this case, the reference resonant circuit 1390 and the reference oscillator 1392 are managed to be blocked from external influences and to maintain initialized settings.

Referring to the embodiments of the multi-channel structures of FIGS. 13 and 4 together as another embodiment of the present invention, each of the plurality of individual regions 432 corresponds to the first component 1330 of FIG. 13, and each of the inductive coils 412 of the plurality of individual inductive channels is connected to the individual channel inductive resonant circuit 1320 of FIG. 13.

The reference resonant circuit 1390 and the inductive determination circuit 1370 may be continuously connected, and the inductive determination circuit 1370 may be sequentially connected to the individual inductive channel resonant circuits 1320 connected to the inductive coils 412 of the individual inductive channels, respectively, through time division multiplexing according to a predetermined schedule.

The displacements of the individual regions 432 of the individual inductive channels in the Z-axis direction may be sequentially identified by the inductive determination circuit 1370 according to a predetermined schedule. The inductive determination circuit 1370 may detect the touch location and touch force of each of the individual inductive channels in which a spatial location is identified, and may detect a pattern in which a spatial distribution of touch force changes in the time domain.

In embodiments of the present invention, the inductive determination circuit 1370 may immediately obtain a differential frequency component between the resonant frequency $\omega\_L\_i$ of each individual inductive channel $L\_i$ and the reference resonant frequency $\omega\_ref$, and thus the inductances, displacements, and touch forces of a plurality of individual inductive channels may be identified at substantially the same time without time delay.

In embodiments of the present invention, the inductive determination circuit 1370 may detect the information of the resonant frequency $\omega\_L\_i$ of each individual inductive channel $L\_i$ independently of the amplitudes of the electric signal of each individual inductive channel and a reference electric signal (without the detection of the amplitudes). In this case, in an embodiment, the conventional technique for detecting amplitudes independently of the resonant frequency $\omega\_L\_i$ may be applied in parallel, and two types of detection information obtained independently of each other (first detection information based on the detection of amplitudes, and second detection information based on the detection of a resonant frequency independent of amplitudes) may be cross-validated by each other.

FIG. 14 is a view showing the circuit of a touch force sensor 1300 according to an embodiment of the present invention and a method of operating the same.

Since the first capacitive channel resonant circuit 1340, oscillator 1342 and touch electrode 1316 of FIG. 14 are the same as the first capacitive channel resonant circuit 1140, oscillator 1142 and touch electrode 1116 of FIG. 12, respectively, redundant descriptions thereof will be omitted.

The capacitive determination circuit 1380 of the touch force sensor 1300 according to the present embodiment may include: an operator 1382 of obtaining the difference between the first capacitive resonant frequency $\omega\_C1$ and the reference resonant frequency $\omega\_ref$; a low-pass filter 1384 connected to the output terminal of the operator 1382, and configured to remove a high-frequency component; and a time-to-digital converter 1386 connected to the output terminal of the low-pass filter 1384, and configured to digitally count the frequency of a differential frequency component signal corresponding to the difference between the first capacitive resonant frequency $\omega\_C1$ and the reference resonant frequency $\omega\_ref$.

The operator 1382 may immediately obtain a differential frequency component signal by using arithmetic operations (addition, subtraction, and multiplication) between a first electric signal and a reference electric signal. The time-to-digital converter 1386 may count the number of pulses of a pulse signal having a differential frequency (or a frequency proportional to the differential frequency) over a predetermined time interval, and may generate a digital count value for the pulse width or period of a pulse signal having a differential frequency (or a frequency proportional to the differential frequency). The operations of the operator 1382 and the time-to-digital converter 1386 are similar to the operations of the operator 1372 and time-to-digital converter 1376 of FIG. 13.

Referring to the embodiments of the multi-channel structures of FIGS. 14 and 4 as another embodiment of the present invention, touch electrodes (not shown in FIG. 4) coupled to the plurality of individual regions 432 constitute a plurality of individual capacitance channels, each correspond to the touch electrode 1316 of FIG. 14, and are each connected to the individual channel capacitive resonant circuit 1340 of FIG. 14.

The reference resonant circuit 1390 and the capacitive determination circuit 1380 may continuously be connected, and the capacitive determination circuit 1380 may sequentially be connected to the individual capacitive channel resonant circuits 1340 connected to the respective touch electrodes of the individual capacitive channels through time division multiplexing according to a predetermined schedule.

Whether an external finger comes into contact with the touch electrode of each of the individual capacitive channels and whether a touched finger is a human finger may be sequentially identified by the capacitive determination circuit 1380 according to a predetermined schedule. The capacitive decision circuit 1380 may detect a touch location of each of the individual capacitive channels where a spatial location is identified and whether a touched finger is an actual human finger.

In embodiments of the present invention, the capacitive determination circuit 1380 may immediately obtain a differential frequency component between the resonant frequency $\omega\_C\_i$ of each individual capacitive channel $C\_i$ and the reference resonant frequency $\omega\_ref$, and thus the capacitances of a plurality of individual capacitive channels, whether a touch has been made, a touch location, and whether a touched finger is an actual human finger may be identified at substantially the same time without time delay.

In embodiments of the present invention, the capacitive determination circuit 1380 may detect the information of the resonant frequency $\omega\_C\_i$ of each individual capacitive channel C_i independently of the amplitudes of the electric signal of each individual capacitive channel and a reference electric signal (without the detection of amplitudes). In this case, in an embodiment, the conventional technique for detecting amplitudes independently of the resonant frequency $\omega\_C\_i$ may be applied in parallel, and two types of detection information obtained independently of each other (third detection information based on the detection of amplitudes, and third detection information based on the detection of a resonant frequency independent of amplitudes) may be cross-validated by each other.

The touch force sensor 1300 according to an embodiment of the present invention may be described with reference to FIGS. 13 and 14 together.

In this case, in the touch force sensor 1300 according to an embodiment of the present invention, the inductive determination circuit 1370 and the capacitive determination circuit 1380 may share one reference resonant circuit 1390 and one reference oscillator 1392.

Reference may be made to a touch force sensor 1300 according to another embodiment of the present invention together with the multi-channel structure of FIG. 4. In other words, referring to FIGS. 4, 13, and 14 together, one reference resonant circuit 1390 and one reference oscillator 1392 may be shared for a plurality of individual inductive channels and individual capacitive channels.

The reference resonant circuit 1390 may be shared by a capacitive determination circuit 1380 and an inductive determination circuit 1370, the capacitive determination circuit 1380 may be shared by a plurality of individual capacitive channels, and the inductive determination circuit 1370 may be shared by a plurality of individual inductive channels.

Figure 15:
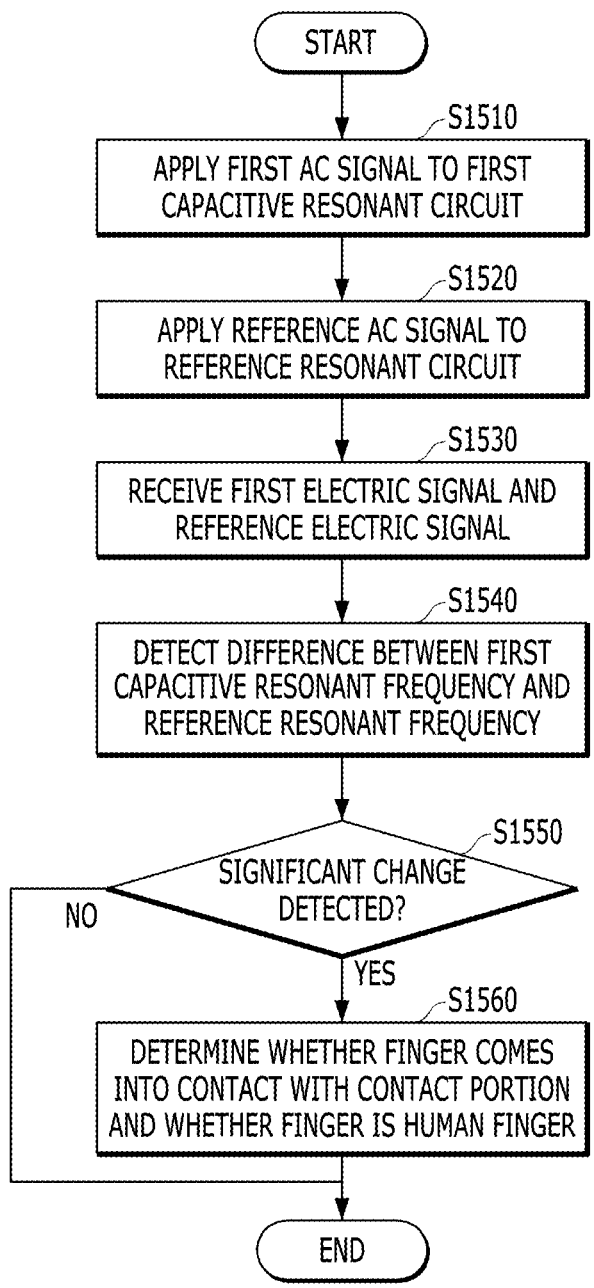
FIG. 15 is an operational flowchart showing a method of operating a touch force sensor according to an embodiment of the present invention.

FIG. 15 is an operational flowchart showing a method of operating the touch force sensor 200, 300, 1100 or 1300 according to an embodiment of the present invention.

Figure 16:
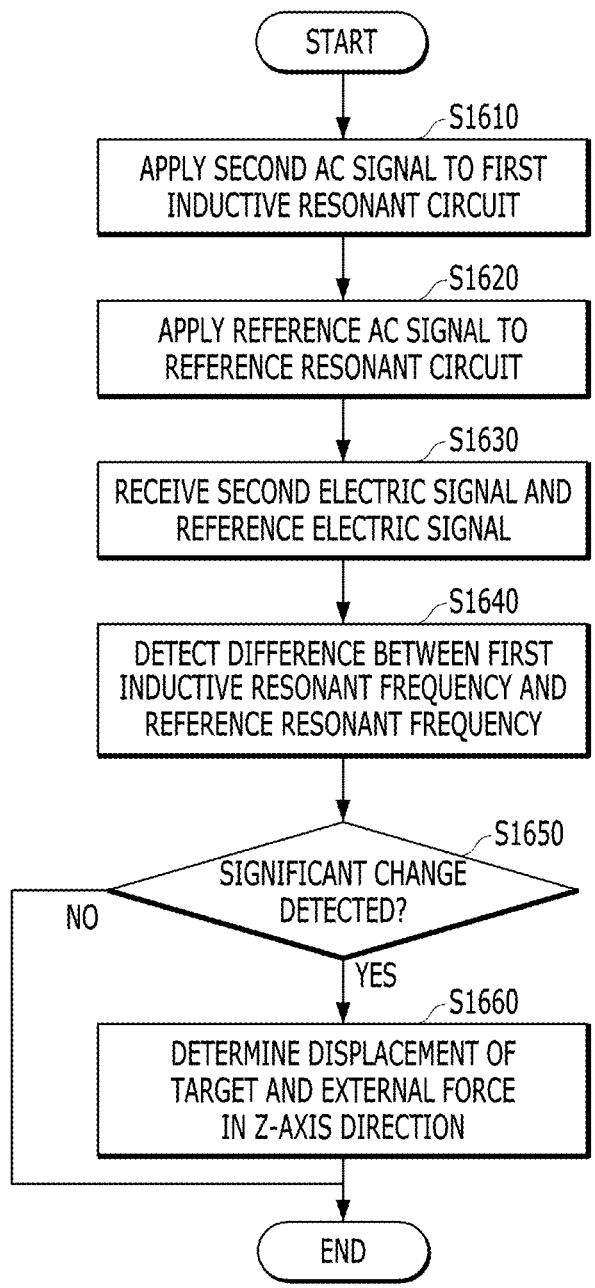
FIG. 16 is an operational flowchart showing a method of operating a touch force sensor according to an embodiment of the present invention.

FIG. 16 is an operational flowchart showing a method of operating the touch force sensor 200, 300, 1100 or 1300 according to an embodiment of the present invention.

For the operation methods of FIGS. 15 and 16, reference will be made to FIGS. 2, 3, 11, 12, 13, and 14 together.

The methods of operating the touch force sensor 200, 300, 1100 or 1300 according to the embodiments of the present invention are performed by the touch force sensor 200, 300, 1100 or 1300 including: the touch electrode 216, 316, 1116 or 1316 disposed in a contact portion with which a finger comes into contact; the first part 230, 330, 1130 or 1330 exposed to the external force 250, 350, 1150 or 1350 in a Z-axis direction, and configured to be elastically deformable along the Z-axis direction by the external force 250, 350, 1150, 1350 in the Z-axis direction; and the inductive coil 212, 312 or 1112 disposed on the substrate 210 or 310 that is spaced apart from the first part 230, 330, 1130 or 1330.

The methods of operating the touch force sensor 200, 300, 1100 or 1300 according to the embodiments of the present invention include: step S1510 of applying a first AC signal to the first capacitive channel resonant circuit 1140 or 1340 connected to the touch electrode 216, 316, 1116 or 1316; step S1610 of applying a second AC signal to the first inductive channel resonant circuit 1120 or 1320 having a first inductive resonant frequency $\omega\_L1$ attributable to a first inductance formed in the inductive coil 212, 312 or 1112 based on the displacement of the first part 230, 330, 1130 or 1330, coupled to the inductive coil 212, 312 or 1112, relative to the inductive coil 212, 312 or 1112; step S1520 or S1620 of applying a reference AC signal to the reference resonant circuit 1390; step S1530 of receiving, by the capacitive determination circuit 1180 or 1380, a first electric signal formed in the first capacitive channel resonant circuit 1140 or 1340 under the influence of the first AC signal; step S1630 of receiving, by the inductive determination circuit 1170 or 1370, a second electric signal formed in the first inductive channel resonant circuit 1120 or 1320 under the influence of the second AC signal; step S1530 or S1630 of receiving, by the capacitive determination circuit 1180 or 1380 and the inductive determination circuit 1170 or 1370, a reference electric signal formed in the reference resonant circuit 1390; step S1560 of determining, by the capacitive determination circuit 1180 or 1380, whether a finger comes into contact with the contact portion and whether a finger that comes into contact with the contact portion is a human finger based on the first capacitive resonant frequency $\omega\_C1$ of the first electric signal and the reference resonant frequency $\omega\_ref$ of the reference electric signal (see step S1540); and step S1660 of determining, by the inductive determination circuit 1170 or 1370, the displacement of the first part 230, 330, 1130 or 1330 and the external force in the Z-axis direction based on the first inductive resonant frequency $\omega\_L1$ of the second electric signal and the reference resonant frequency $\omega\_ref$ (see step S1640).

In this case, when the difference between the first capacitive resonant frequency $\omega\_C1$ and the reference resonant frequency $\omega\_ref$ detected at step S1540 is equal to or larger than a second threshold value, it is determined that the first capacitive resonant frequency $\omega\_C1$ has caused a significant change at step S1550.

In this case, when the difference between the first inductive resonant frequency $\omega\_L1$ and the reference resonant frequency $\omega\_ref$ detected at step S1640 is equal to or larger than a first threshold value, it is determined that the first inductive resonant frequency $\omega\_L1$ has caused a significant change step S1650.

In this case, step S1660 of determining, by the inductive determination circuit 1170 or 1370, the displacement of the first part 230, 330, 1130 or 1330 and the external force in the Z-axis direction may include: step S1640 of detecting the difference between the reference resonant frequency $\omega\_ref$ and the first inductive resonant frequency $\omega\_L1$; and the step of obtaining the extent to which the first inductive channel resonant circuit 1120 or 1320 deviates from a first state having the same impedance as the reference resonant circuit 1390, the displacement of the first part 230, 330, 1130 or 1330 relative to the inductive coil 212, 312 or 1112, and quantified detection information for the external force in the Z-axis direction based on the difference between the reference resonant frequency $\omega\_ref$ and the first inductive resonant frequency $\omega\_L1$.

Figure 17:
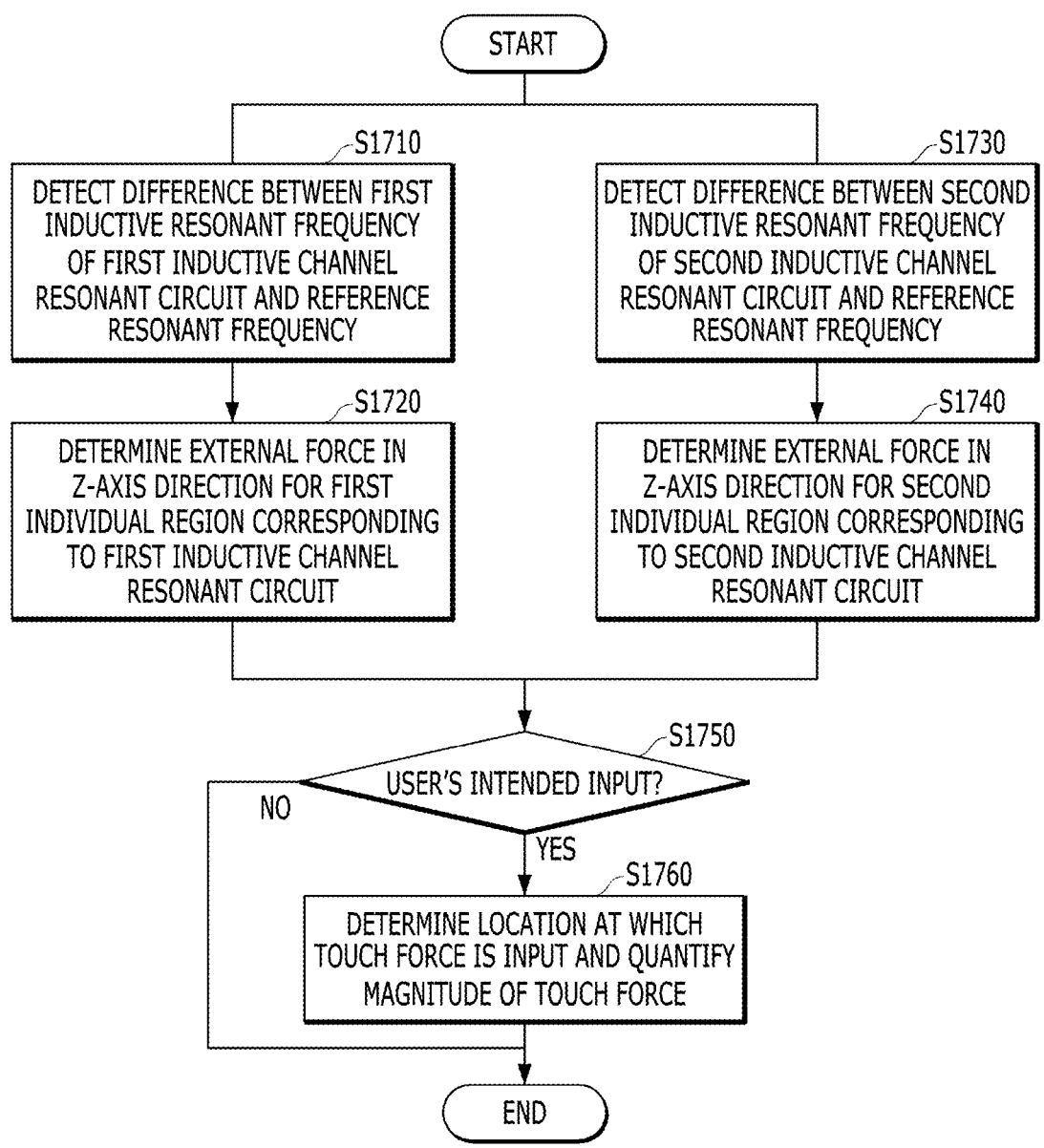
FIG. 17 is an operational flowchart showing a method of operating a touch force sensor according to an embodiment of the present invention.

FIG. 17 is an operational flowchart showing a method of operating the touch force sensor 400, 1100 or 1300 according to an embodiment of the present invention.

The operation method of FIG. 17 may be performed by the multi-channel touch force sensor 400, 1100 or 1300 for which reference is made to FIGS. 4, 11 and 13 together.

In the method of operating the touch force sensor 400, 1100, or 1300 according to the present embodiment, steps S1610 to S1630 of FIG. 16 are performed on the first inductive channel, and particularly the inductive determination circuit 1170 or 1370 performs step S1630. Furthermore, steps S1610 to S1630 of FIG. 16 are separately performed for the second inductive channel. Step S1630 is performed by the inductive determination circuit 1170 or 1370 shared by a plurality of inductive channels.

The inductive determination circuit 1170 or 1370 performs step S1720 or S1740 of determining the first displacement of the first inductive channel, the second displacement of the second inductive channel, and a location at which an external force in the Z-axis direction is input and the external force based on the difference between the reference resonant frequency ω_ref and the first inductive resonant frequency ω_L1 (see step S1710) and the difference between the reference resonant frequency ω_ref and the second inductive resonant frequency ω_L2 (see step S1730).

At S1750, the inductive determination circuit 1170 or 1370 determines whether the touch force detected for the first and second inductive channels is an input intended by a user and whether a change in the signal has been caused by an error or another factor not intended by the user, based on the results of steps S1720 and S1740.

If, as a result of the determination at step S1750, it is determined that the touch force is an input intended by the user, the inductive determination circuit 1170 or 1370 digitizes and quantifies a location where touch force is input for an area including the first and second inductive channels and the magnitude of the touch force at step S1760.

The method of operating a circuit according to an embodiment of the present invention may be implemented in the form of program instructions, and may be then recorded in a computer-readable storage medium. The computer-readable storage medium may include program instructions, data files, and data structures solely or in combination. Program instructions recorded on the storage medium may have been specially designed and configured for the present invention, or may be known to or available to those who have ordinary knowledge in the field of computer software. Examples of the computer-readable storage medium include all types of hardware devices specially configured to record and execute program instructions, such as magnetic media, such as a hard disk, a floppy disk, and magnetic tape, optical media, such as compact disk (CD)-read only memory (ROM) and a digital versatile disk (DVD), magneto-optical media, such as a floptical disk, ROM, random access memory (RAM), and flash memory. Examples of the program instructions include machine code, such as code created by a compiler, and high-level language code executable by a computer using an interpreter. These hardware devices may be configured to operate as one or more software modules in order to perform the operation of the present invention, and the vice versa.

However, the present invention is not limited to the embodiments. Like reference symbols in the drawings designate like components. The lengths, heights, sizes, widths, etc. introduced in the embodiments and drawings of the present invention may be exaggerated to help to understand.

According to the present invention, the performance of the inductive sensor is improved and thus the inductive sensor detects a touch force, and the capacitive sensor may detect whether a touched finger is an actual human finger. The location of a touch may be detected by the capacitive sensor and the inductive sensor independently of each other, in which case pieces of touch location information may be cross-validated by each other.

According to the present invention, whether the touch force detected by the inductive sensor is the touch force actually generated by a human finger is checked based on the information detected by the capacitive sensor, thereby preventing erroneous operation from being performed by the force accidentally applied from the outside.

According to the present invention, the precision and reliability of the detection of touch and touch force may be increased using the capacitive sensor and the inductive sensor that operate independently of each other.

In this case, the touch location, and/or touch force detected by the inductive sensor of the present invention may be simultaneously represented by one output value. The touch location, information about whether a touch has been made, and information about whether a touched finger is an actual human finger detected by the capacitive sensor of the present invention may be also represented by one output value simultaneously.

According to the present invention, a change in inductance may be detected through a single measurement without a frequency component scan, and thus power consumption may be reduced and sensing time may be decreased.

According to the present invention, a change in inductance may be precisely detected through a per-sensor single measurement without frequency component scan. Accordingly, even when an inductive sensor array or inductive sensor matrix is formed and operated, it is relatively free from the constraints of power consumption and sensing time, and various touch patterns, touch gestures, and touch conditions may be accurately determined using the array or matrix.

According to an embodiment of the present invention, a change in the time domain may be detected and a gesture may be recognized using the single channel- or single coil-based inductive sensor.

According to an embodiment of the present invention, whether there is an error in a sensing result may be validated by combining the sensing results simultaneously detected for a plurality of channels or coils. Whether the touch force obtained as a result of sensing is generated by a user's intention or by an error may be validated by considering the locational relationships between the sensing results simultaneously detected for a plurality of coils and the regions covered by the coils.

Since the conventional technologies detect only the amplitude of a resonant signal or the amplitude of an analog AC signal, it may be detected only whether a detected result exceeds a predetermined threshold value. However, the present invention calculates and digitally counts a difference in the resonant frequency of a differential signal, and thus quantified detection information may be obtained, so that temporal and spatial changes in touch force may be precisely detected using the quantified detection information.

According to the present invention, the single reference resonant circuit is shared by the capacitive sensor and the inductive sensor, and thus the size and form factor of the touch force sensor may be reduced. Furthermore, in the present invention, the single reference resonant circuit is shared by the multi-channel capacitive sensor and the inductive sensor, and thus hardware cost may be reduced.

According to the present invention, the capacitive sensor and the inductive sensor may independently detect a touch location. Accordingly, one capacitive sensor may be disposed to cover the same area as inductive sensors of multiple channels, or one inductive sensor may be disposed to cover the same area as capacitive sensors of multiple channels. In other words, according to the present invention, an advantage arises in that an array of capacitive sensors and inductive sensors may be adaptively adjusted and arranged in accordance with a performance index required by a device.

According to the present invention, the hybrid sensor includes the capacitive sensor and the inductive sensor which independently operate and reduces significantly risk of erroneous operation thereby. When the hybrid sensor is used for the automotive applications, the present invention may improve highly its safety which is the most important factor for the automotive applications.

Although the present invention has been described with reference to specific details such as the specific components, and the limited embodiments and drawings, these are provided merely to help a general understanding of the present invention, and the present invention is not limited thereto. Furthermore, those having ordinary skill in the technical field to which the present invention pertains may make various modifications and variations from the above detailed description.

Therefore, the spirit of the present invention should not be defined based only on the described embodiments, and not only the attached claims but also all equivalent to the claims should be construed as falling within the scope of the spirit of the present invention.

What is claimed is:

1. A touch force sensor comprising:
   a first capacitive channel resonant circuit connected to a touch electrode disposed in a contact portion with which a finger comes into contact;
   a first oscillator configured to apply a first alternating current (AC) signal to the first capacitive channel resonant circuit;
   a capacitive determination circuit configured to:
      detect a first capacitive resonant frequency of a first electric signal formed in the first capacitive channel resonant circuit; and
      determine whether a finger comes into contact with the contact portion and whether a finger that comes into contact with the contact portion is a human finger based on the detected first capacitive resonant frequency;
   a first part exposed to an external force in a Z-axis direction, and configured to be elastically deformable along the Z-axis direction by the external force in the Z-axis direction;
   an inductive coil disposed on a substrate that is spaced apart from the first part;
   a first inductive channel resonant circuit coupled to the inductive coil, and configured to have a first inductive resonant frequency attributable to a first inductance formed in the inductive coil based on a displacement of the first part relative to the inductive coil;
   a second oscillator configured to apply a second AC signal to the first inductive channel resonant circuit;
   an inductive determination circuit configured to:
      receive a second electric signal formed in the first inductive channel resonant circuit; and
      determine the displacement of the first part and the external force in the Z-axis direction based on a first inductive resonant frequency of the second electric signal;
   a reference resonant circuit; and
   a reference oscillator configured to:
      have same characteristics as the first and second oscillators; and
      apply a reference AC signal to the reference resonant circuit,
   wherein the capacitive determination circuit receives a reference electric signal formed in the reference resonant circuit and determines whether a finger comes into contact with the contact portion and whether a finger that comes into contact with the contact portion is a human finger based on the detected first capacitive resonant frequency and a reference resonant frequency of the reference electric signal, and
   wherein the inductive determination circuit receives the reference electric signal and determines the displacement of the first part and the external force in the Z-axis direction based on the first inductive resonant frequency and the reference resonant frequency.

2. The touch force sensor of claim 1,
   wherein the capacitive determination circuit detects a difference between the reference resonant frequency of the reference electric signal, formed in the reference resonant circuit under an influence of the reference AC signal applied to the reference resonant circuit, and the first capacitive resonant frequency, and determines whether a finger comes into contact with the contact portion and whether a finger that comes into contact with the contact portion is a human finger based on the difference between the reference resonant frequency and the first capacitive resonant frequency, and
   wherein the inductive determination circuit detects a difference between the reference resonant frequency and the first inductive resonant frequency, and determines the displacement of the first part and the external force in the Z-axis direction based on the difference between the reference resonant frequency and the first inductive resonant frequency.

3. The touch force sensor of claim 2, wherein the inductive determination circuit performs a calibration process based on the difference between the first inductive resonant frequency and the reference resonant frequency in a state in which the first inductive channel resonant circuit has been externally and forcibly adjusted to a first state having a same impedance as the reference resonant circuit.

4. The touch force sensor of claim 1, wherein, in response to a human finger coming into contact with the contact portion from an outside and the external force in the Z-axis direction is applied by the contact of the finger, the capacitive determination circuit detects a touch location of the finger, the inductive determination circuit detects a touch location of the finger, or each of the capacitive determination circuit and the inductive determination circuit detects a touch location of the finger and performs cross-validation.

5. The touch force sensor of claim 1, wherein the inductive determination circuit is further configured to, in response to detecting that a difference between the reference resonant frequency and the first inductive resonant frequency is equal to or larger than a first threshold value, determine that the external force in the Z-axis direction has been input by considering that the first inductive resonant frequency has caused a significant change.

6. The touch force sensor of claim 1, wherein the capacitive determination circuit is further configured to, in response to detecting that a difference between the reference resonant frequency and the first capacitive resonant frequency is equal to or larger than a second threshold value, determine that a finger comes into contact with the contact portion by considering that the first capacitive resonant frequency has caused a significant change.

7. The touch force sensor of claim 1, wherein the capacitive determination circuit is further configured to determine whether a finger that comes into contact with the contact portion is a human finger based on whether a difference between the reference resonant frequency and the first capacitive resonant frequency is equal to or larger than a third threshold value.

8. The touch force sensor of claim 1, wherein the inductive determination circuit comprises:
   an operator configured to obtain a difference between the first inductive resonant frequency and the reference resonant frequency;
   a low-pass filter connected to an output terminal of the operator, and configured to remove a high-frequency component; and
   a time-to-digital converter connected to an output terminal of the low-pass filter, and configured to digitally count a frequency of a differential frequency component signal corresponding to the difference between the first inductive resonant frequency and the reference resonant frequency.

9. A touch force sensor comprising:
   a first capacitive channel resonant circuit connected to a first touch electrode of a plurality of touch electrodes disposed in a contact portion with which a finger comes into contact;
   a second capacitive channel resonant circuit connected to a second touch electrode of the plurality of touch electrodes disposed in the contact portion with which the finger comes into contact;
   a capacitive determination circuit configured to:
     detect a first capacitive resonant frequency of a first electric signal generated by application of a first alternating current (AC) signal to the first capacitive channel resonant circuit;
     detect a second capacitive resonant frequency of a second electric signal generated by application of a second AC signal to the second capacitive channel resonant circuit;
     determine whether the finger comes into contact with a first touch electrode location corresponding to the first touch electrode of the contact portion based on the detected first capacitive resonant frequency;
     determine whether the finger comes into contact with a second touch electrode location corresponding to the second touch electrode of the contact portion based on the detected second capacitive resonant frequency; and
     determine whether a finger that comes into contact with the contact portion is a human finger based on the first capacitive resonant frequency and the second capacitive resonant frequency;
   a second part exposed to an external force in a Z-axis direction, and configured to include a plurality of individual regions elastically deformable along the Z-axis direction by the external force in the Z-axis direction;
   a plurality of inductive coils disposed on a substrate that is spaced apart from the second part, configured to correspond to the plurality of individual regions, respectively, and disposed to be opposite to the plurality of individual regions, respectively;
   a first inductive channel resonant circuit coupled to a first inductive coil of the plurality of inductive coils, and configured to have a first inductive resonant frequency attributable to a first inductance formed in the first inductive coil based on a first displacement of a first individual region corresponding to the first inductive coil;
   a second inductive channel resonant circuit coupled to a second inductive coil of the plurality of inductive coils, and configured to have a second inductive resonant frequency attributable to a second inductance formed in the second inductive coil based on a second displacement of a second individual region corresponding to the second inductive coil; and
   an inductive determination circuit configured to:
     receive a third electric signal generated by application of a third AC signal to the first inductive channel resonant circuit and a fourth electric signal generated by application of a fourth AC signal to the second inductive channel resonant circuit; and
     determine the first displacement, the second displacement, a location at which the external force in the Z-axis direction is input, and the external force based on the first inductive resonant frequency of the third electric signal and the second inductive resonant frequency of the fourth electric signal.

10. The touch force sensor of claim 9, further comprising a reference resonant circuit,
    wherein the capacitive determination circuit detects a difference between a reference resonant frequency of a reference electric signal, formed in the reference resonant circuit under an influence of the reference AC signal applied to the reference resonant circuit, and the first capacitive resonant frequency, and determines whether the finger comes into contact with the first touch electrode location and whether a finger that comes into contact with the first touch electrode location is a human finger based on the difference between the reference resonant frequency and the first capacitive resonant frequency,
    wherein the capacitive determination circuit detects a difference between the reference resonant frequency and the second capacitive resonant frequency, and determines whether the finger comes into contact with the second touch electrode location and a finger that comes into contact with the second touch electrode location is a human finger based on the difference between the reference resonant frequency and the second capacitive resonant frequency,
    wherein the inductive determination circuit detects a difference between the reference resonant frequency and the first inductive resonant frequency, and obtains quantified detection information for the external force in the Z-axis direction appearing in the first displacement and the first individual region based on the difference between the reference resonant frequency and the first inductive resonant frequency, and
    wherein the inductive determination circuit detects a difference between the reference resonant frequency and the second inductive resonant frequency, and obtains quantified detection information for the external force in the Z-axis direction appearing in the second displacement and the second individual region based on the difference between the reference resonant frequency and the second inductive resonant frequency.

11. The touch force sensor of claim 9, wherein, in response to a human finger coming into contact with the contact portion from an outside and the external force in the Z-axis direction is applied by the contact of the finger, the capacitive determination circuit detects a touch location at which the finger comes into contact with the contact portion based on whether the finger comes into contact with the first touch electrode location or the second touch electrode location, the inductive determination circuit detects the touch location based on whether the finger comes in proximity to the first individual region or the second individual region, or each of the capacitive determination circuit and the inductive determination circuit detects the touch location and performs cross-validation.

12. The touch force sensor of claim 9, wherein the inductive determination circuit is further configured to, in response to detecting that at least one of a difference between a reference resonant frequency and the first inductive resonant frequency and a difference between the reference resonant frequency and the second inductive resonant frequency is equal to or larger than a first threshold value, determine that the external force in the Z-axis direction has been input by considering that at least one of the first inductive resonant frequency and the second inductive resonant frequency has caused a significant change.

13. The touch force sensor of claim 9, wherein the capacitive determination circuit is configured to, in response to detecting that at least one of a difference between a reference resonant frequency and the first capacitive resonant frequency and a difference between the reference resonant frequency and the second capacitive resonant frequency is equal to or larger than a second threshold value, determine that a finger comes into contact with the contact portion by considering that at least one of the first capacitive resonant frequency and the second capacitive resonant frequency has caused a significant change, and
wherein the capacitive determination circuit is configured to determine whether a finger that comes into contact with the contact portion is a human finger based on whether at least one of a difference between the reference resonant frequency and the first capacitive resonant frequency and a difference between the reference resonant frequency and the second capacitive resonant frequency is equal to or larger than a third threshold value.

14. The touch force sensor of claim 9, wherein the first touch electrode covers a first group area including a first group of a plurality of individual regions among the plurality of individual regions, and the second touch electrode covers a second group area including a second group of a plurality of individual regions among the plurality of individual regions.

15. The touch force sensor of claim 9, wherein the first individual region covers a third group area including touch electrode locations of a third group of a plurality of touch electrodes among the plurality of touch electrodes, and the second individual region covers a fourth group area including touch electrode locations of a fourth group of a plurality of touch electrodes among the plurality of touch electrodes.

16. The touch force sensor of claim 9, wherein the inductive determination circuit comprises:
an operator configured to obtain a difference between the first inductive resonant frequency and a reference resonant frequency and a difference between the second inductive resonant frequency and the reference resonant frequency;
a low-pass filter connected to an output terminal of the operator, and configured to remove a high-frequency component; and
a time-to-digital converter connected to an output terminal of the low-pass filter, and configured to digitally count a frequency of a first differential frequency component signal corresponding to the difference between the first inductive resonant frequency and the reference resonant frequency and a frequency of a second differential frequency component signal corresponding to the difference between the second inductive resonant frequency and the reference resonant frequency.

17. A method of operating a touch force sensor including a touch electrode disposed in a contact portion with which a finger comes into contact, a first part exposed to an external force in a Z-axis direction and configured to be elastically deformable along the Z-axis direction by the external force in the Z-axis direction, and an inductive coil disposed on a substrate that is spaced apart from the first part, the method comprising:
applying a first alternating current (AC) signal to a first capacitive channel resonant circuit connected to the touch electrode;
applying a second AC signal to a first inductive channel resonant circuit having a first inductive resonant frequency attributable to a first inductance formed in the inductive coil based on a displacement of the first part, coupled to the inductive coil, relative to the inductive coil;
applying a reference AC signal to a reference resonant circuit;
receiving, by a capacitive determination circuit, a first electric signal formed in the first capacitive channel resonant circuit under an influence of the first AC signal;
receiving, by an inductive determination circuit, a second electric signal formed in the first inductive channel resonant circuit under an influence of the second AC signal;
receiving, by the capacitive determination circuit and the inductive determination circuit, a reference electric signal formed in the reference resonant circuit;
determining, by the capacitive determination circuit, whether a finger comes into contact with the contact portion and whether a finger that comes into contact with the contact portion is a human finger based on a first capacitive resonant frequency of the first electric signal and a reference resonant frequency of the reference electric signal; and
determining, by the inductive determination circuit, the displacement of the first part and the external force in the Z-axis direction based on a first inductive resonant frequency of the second electric signal and the reference resonant frequency.

18. The method of claim 17, wherein the determining the displacement of the first part and the external force in the Z-axis direction comprises:
detecting a difference between the reference resonant frequency and the first inductive resonant frequency; and
obtaining an extent to which the first inductive channel resonant circuit deviates from a first state having a same impedance as the reference resonant circuit, the displacement of the first part relative to the inductive coil, and quantified detection information for the external force in the Z-axis direction based on the difference between the reference resonant frequency and the first inductive resonant frequency.

* * * * *